Sept. 2, 1969  T. J. DULL ET AL  3,464,463
APPARATUS FOR FORMING WIRE STOCK
Filed May 29, 1967  12 Sheets-Sheet 1

INVENTOR
Thomas J. Dull
Clifford Goldmeyer
BY
Wood, Herron & Evans
ATTORNEYS

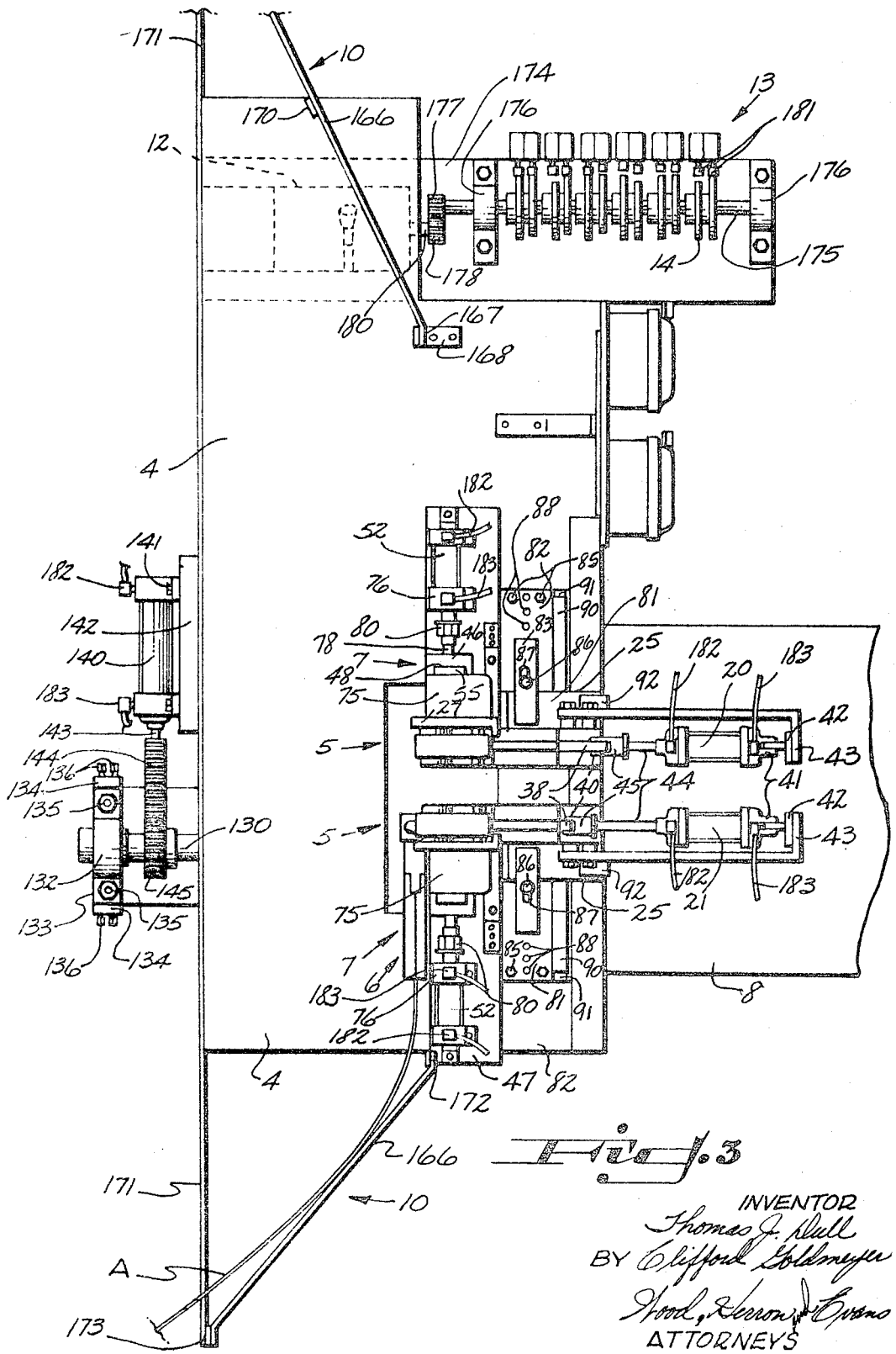

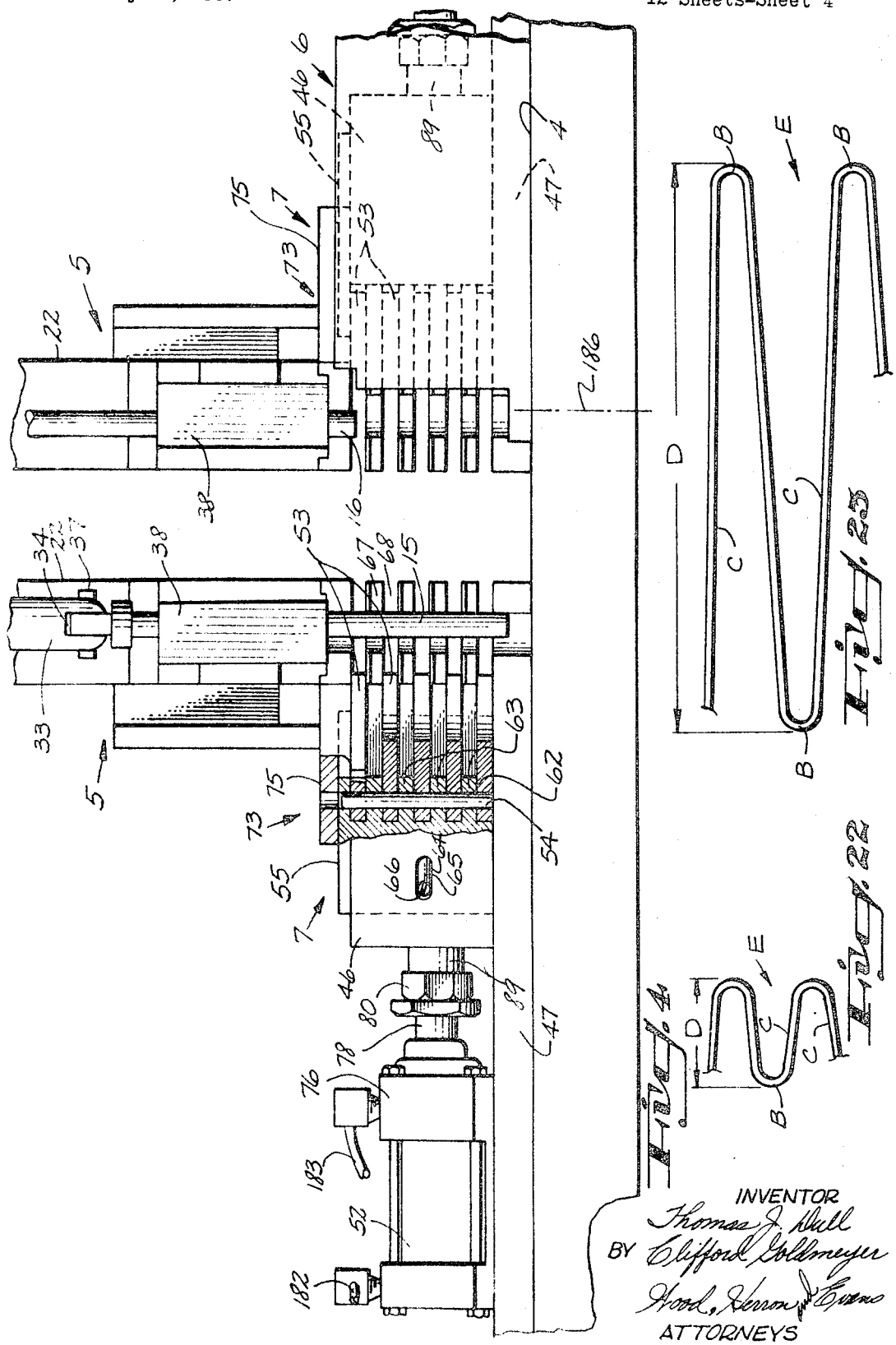

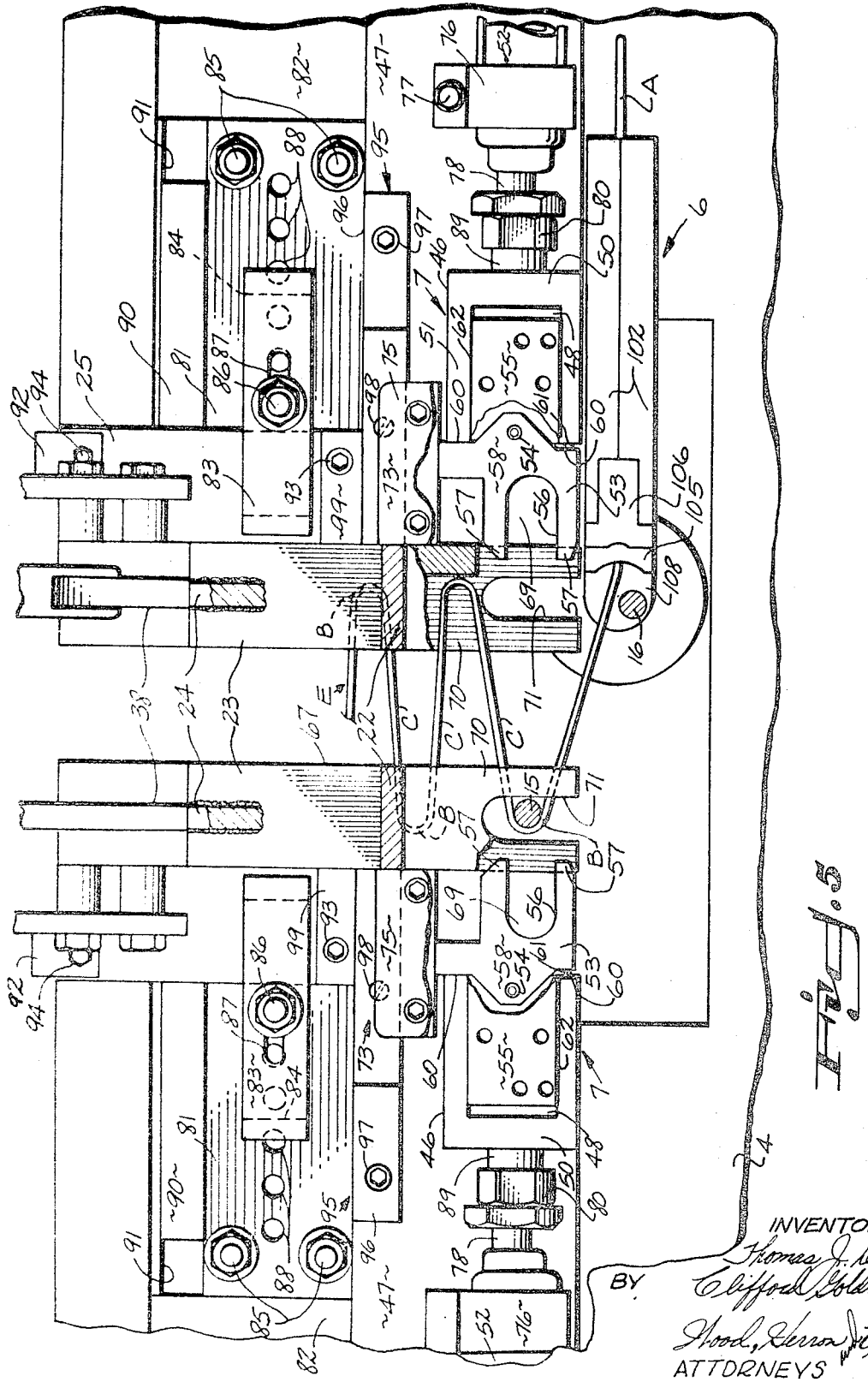

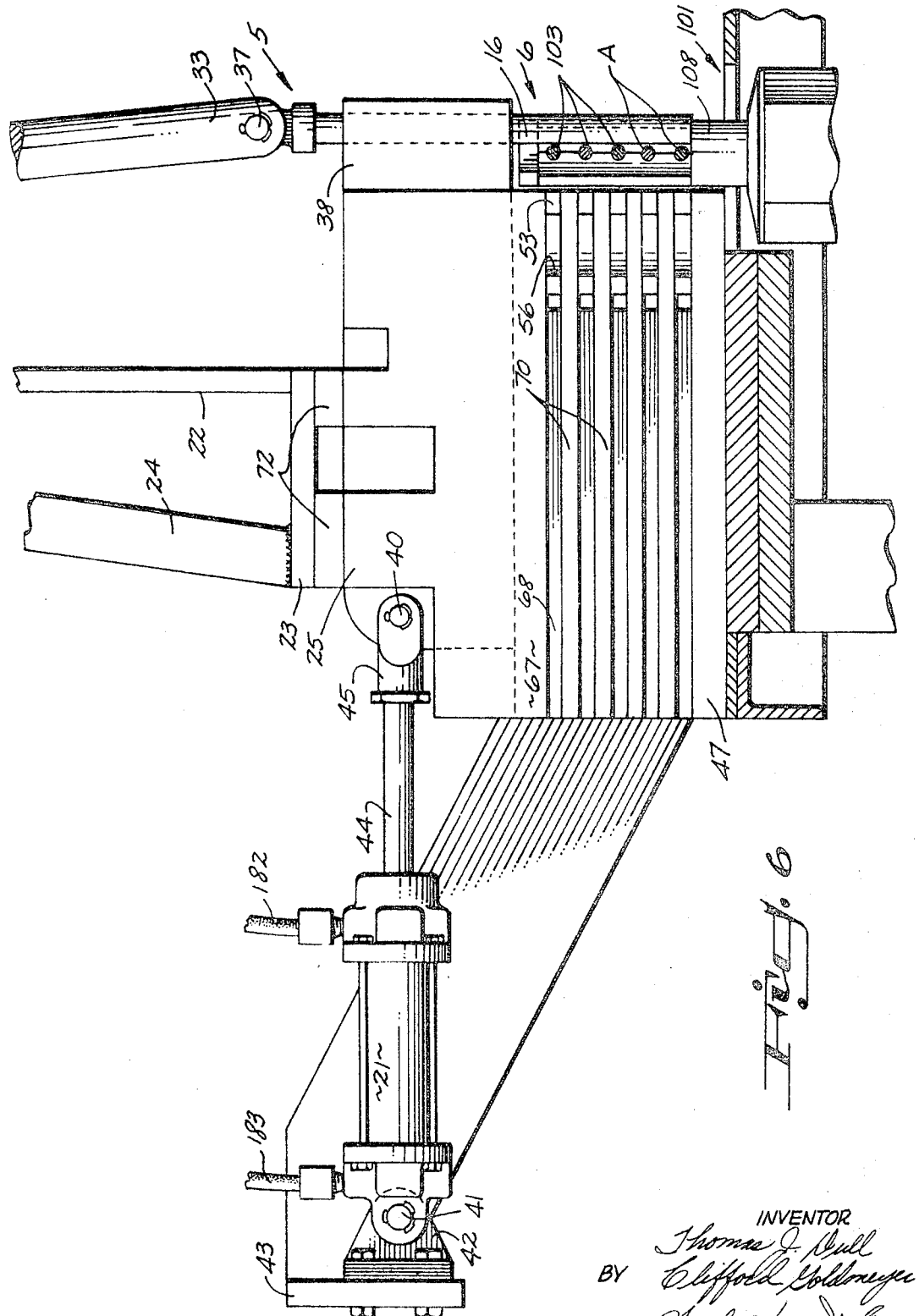

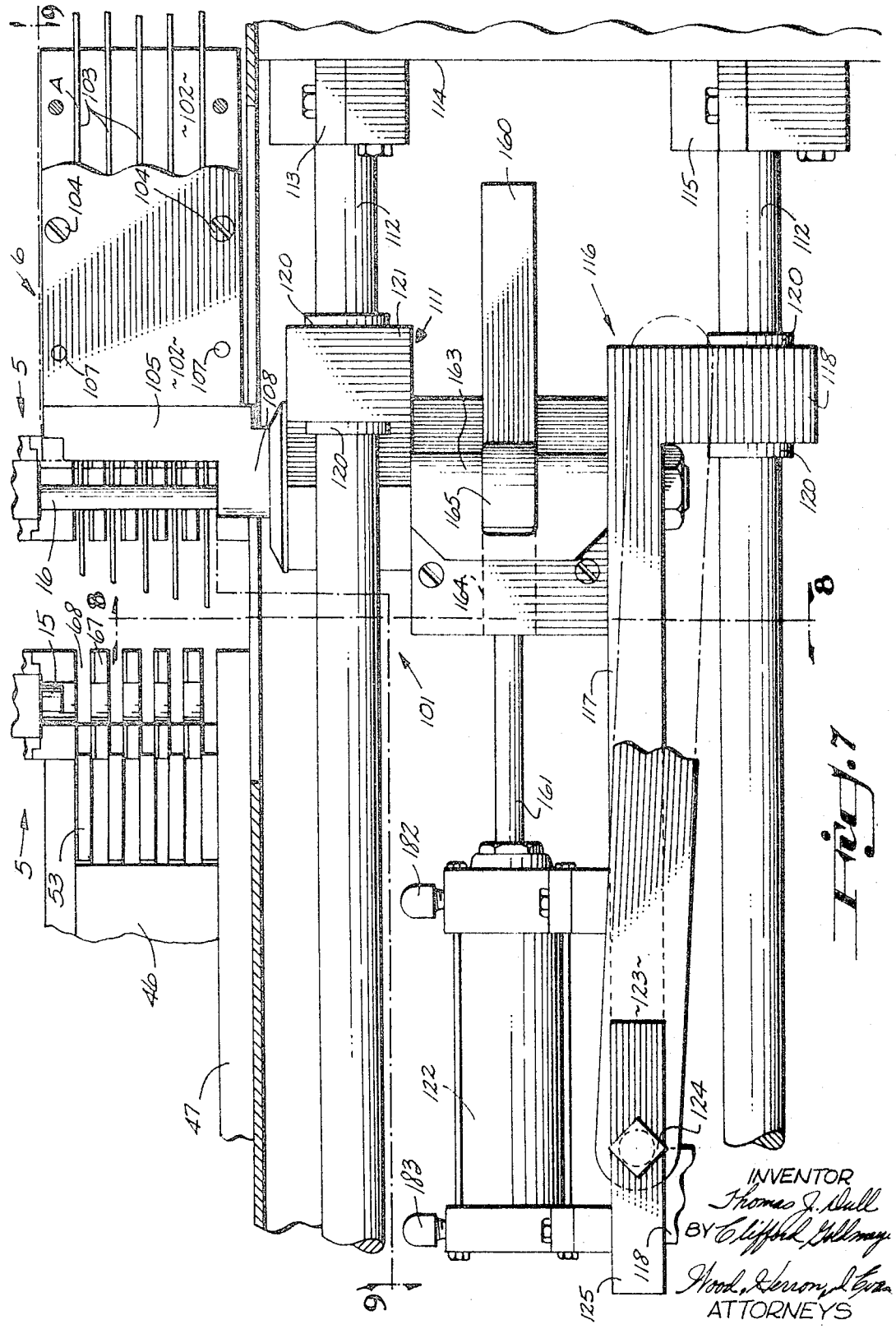

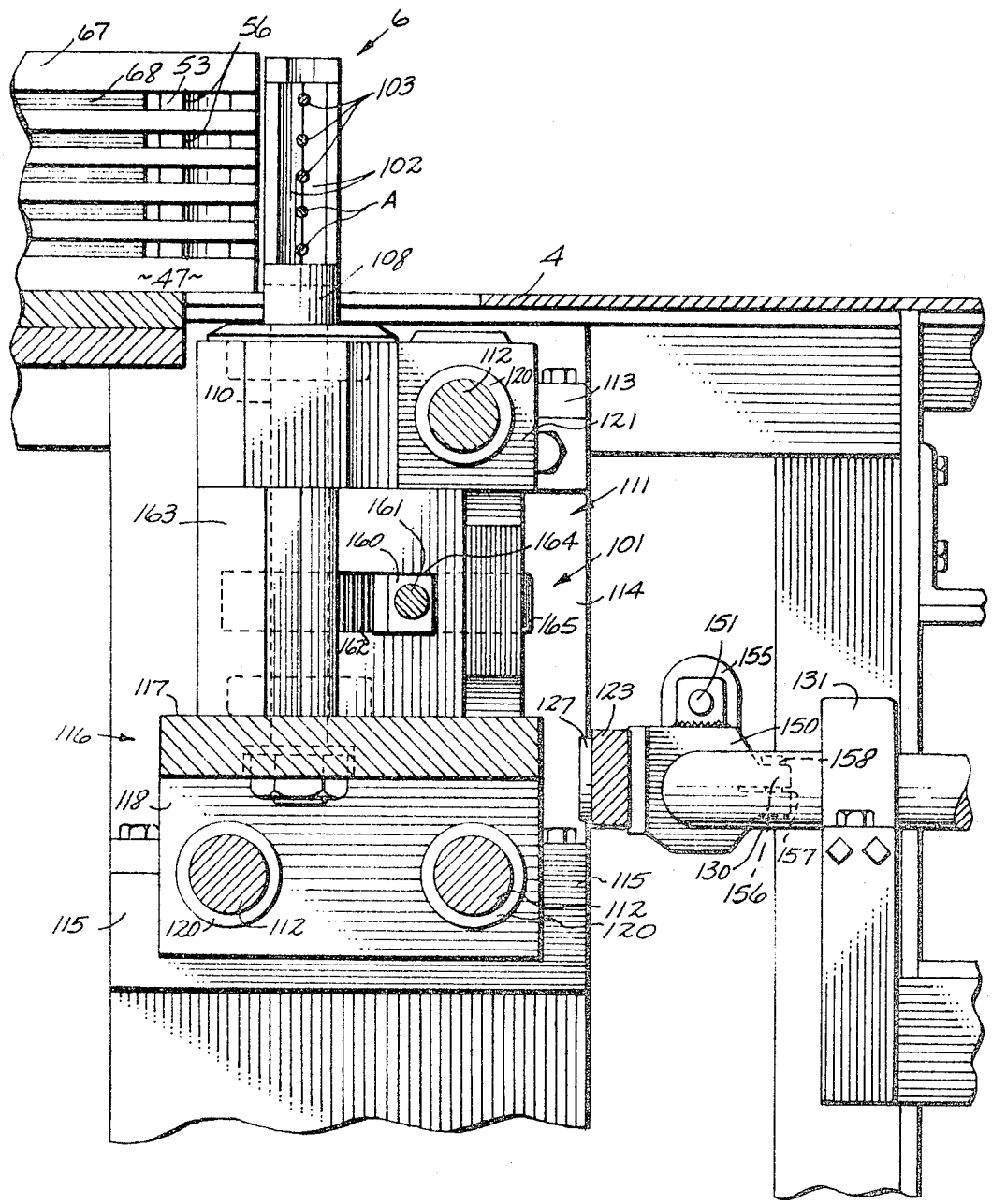

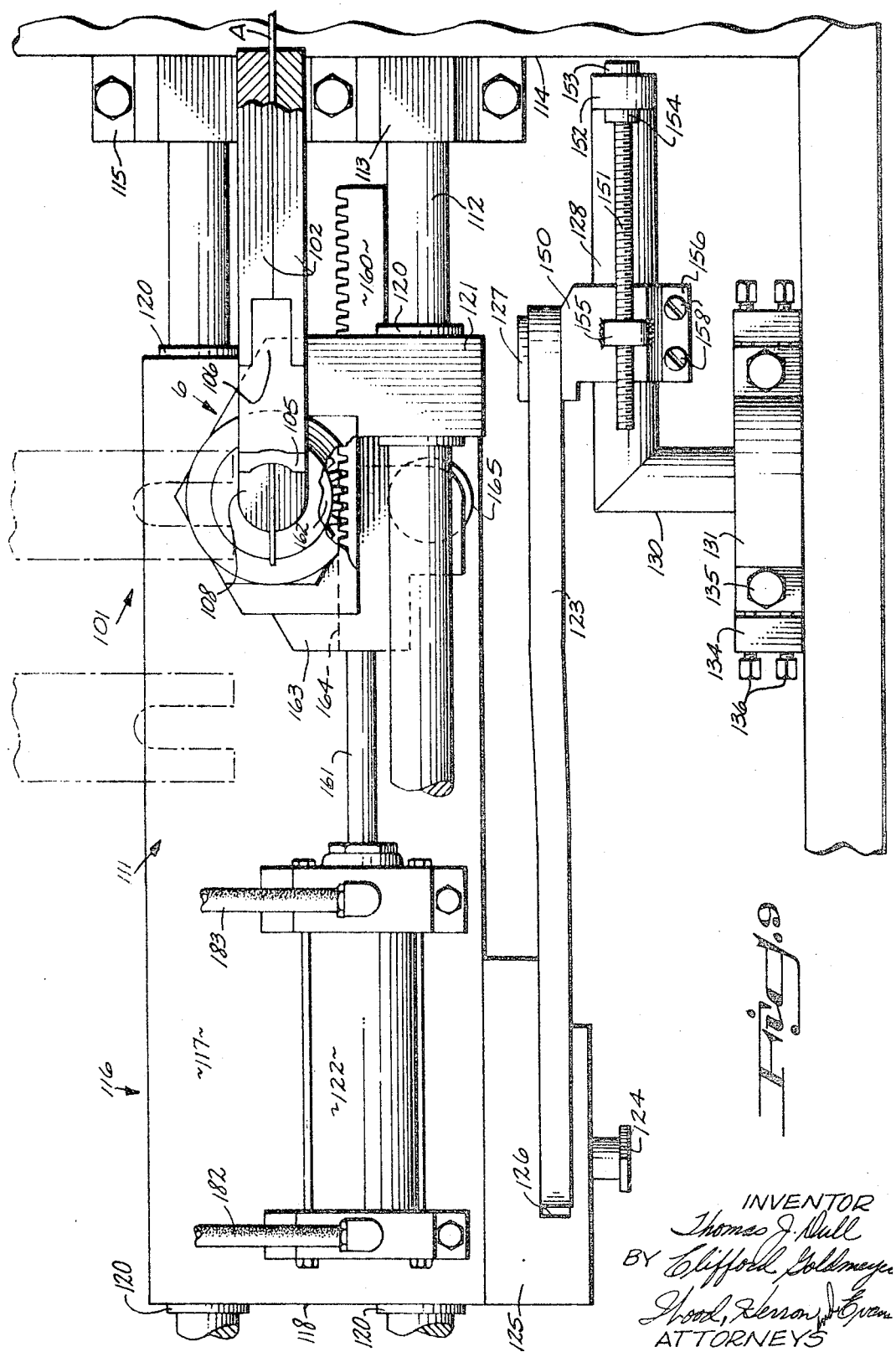

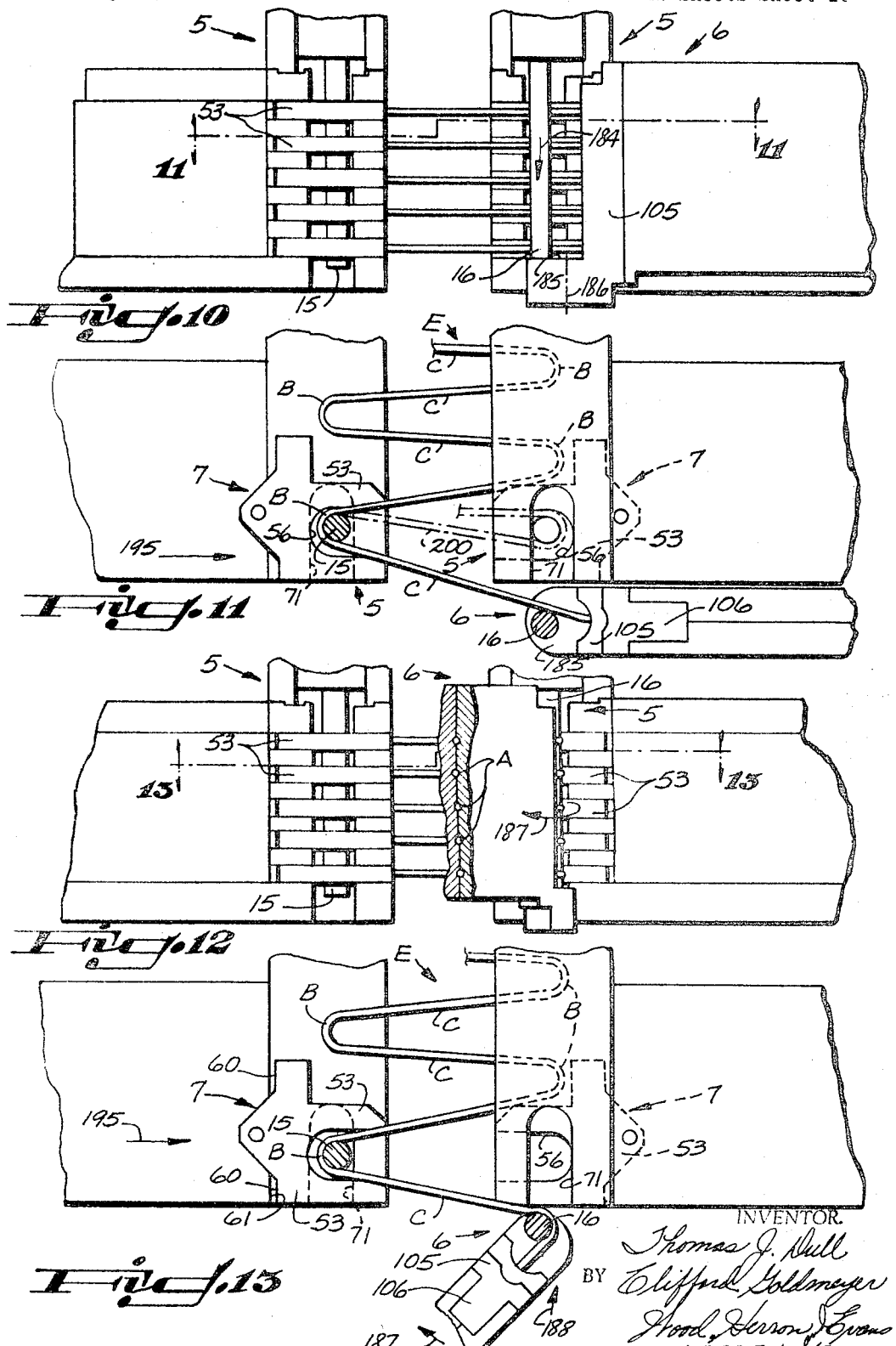

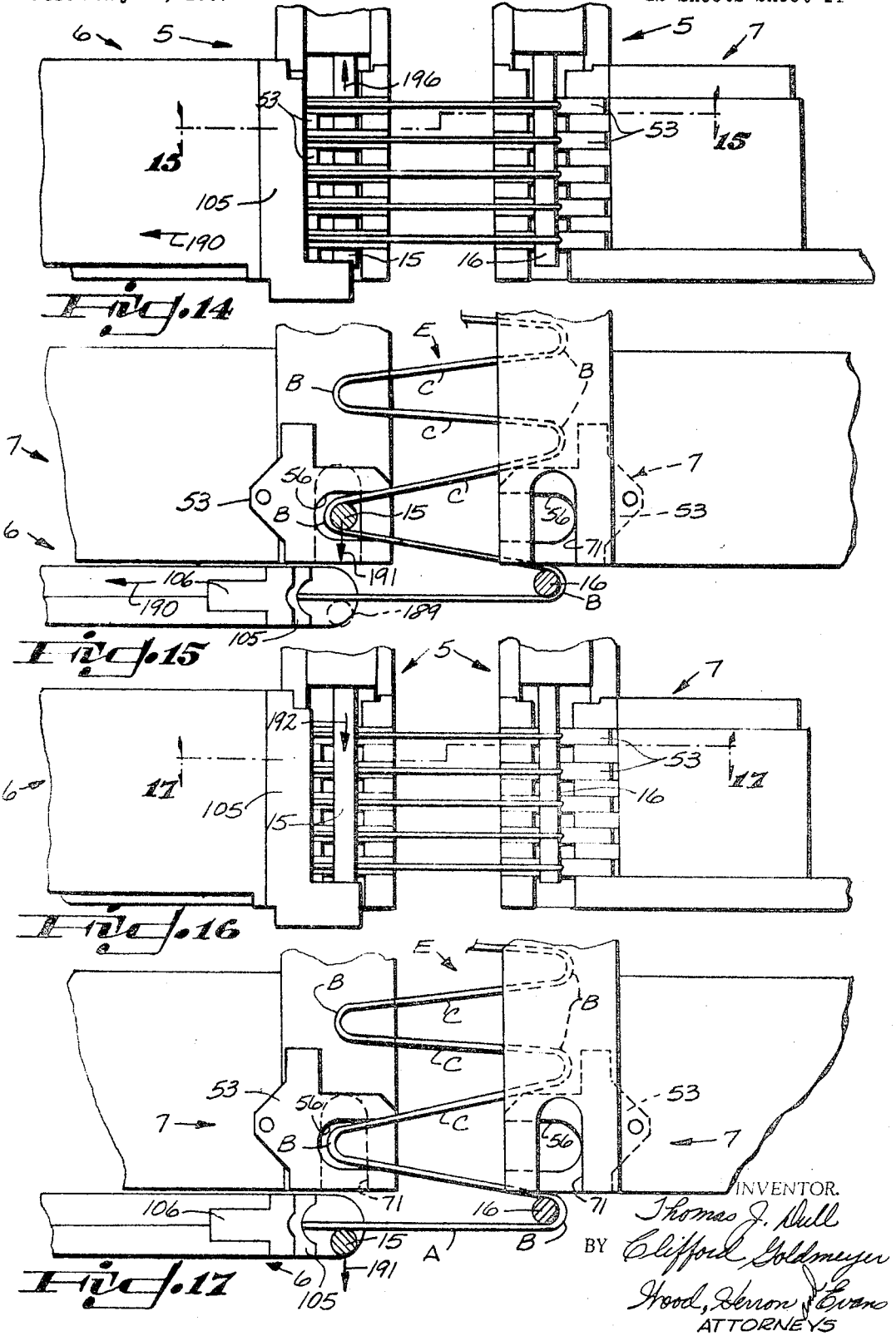

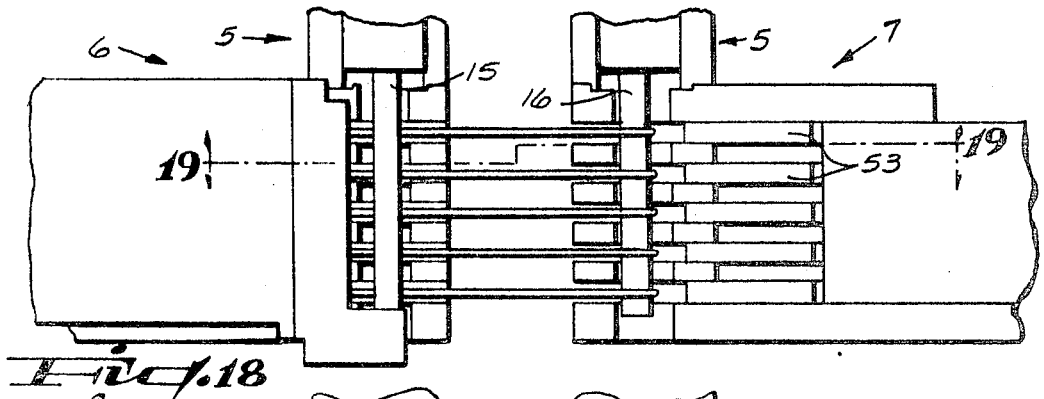
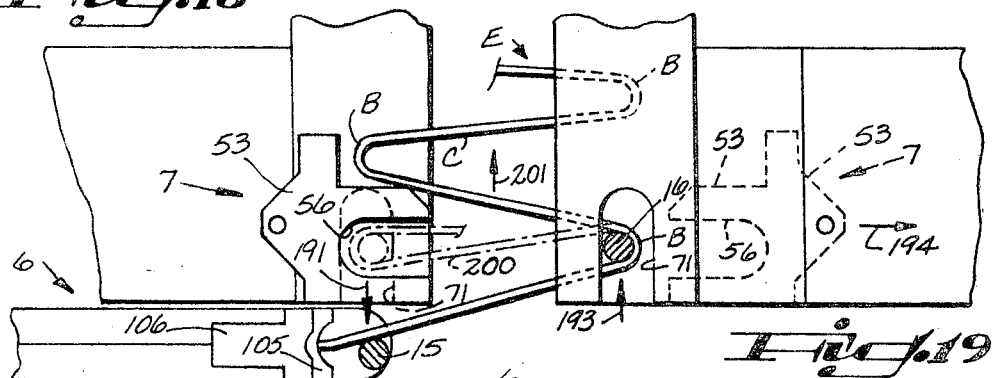
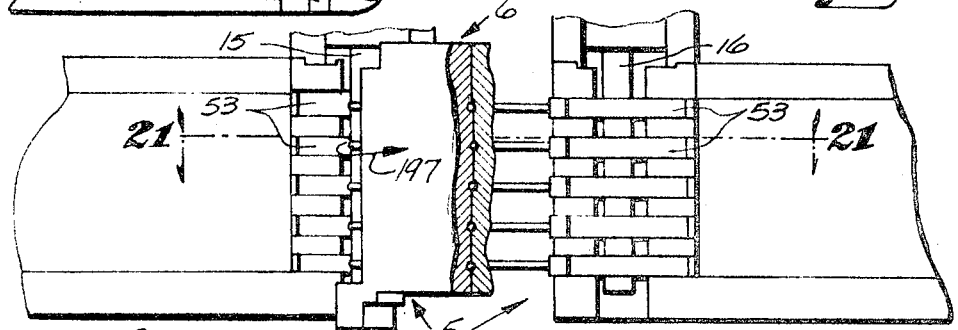
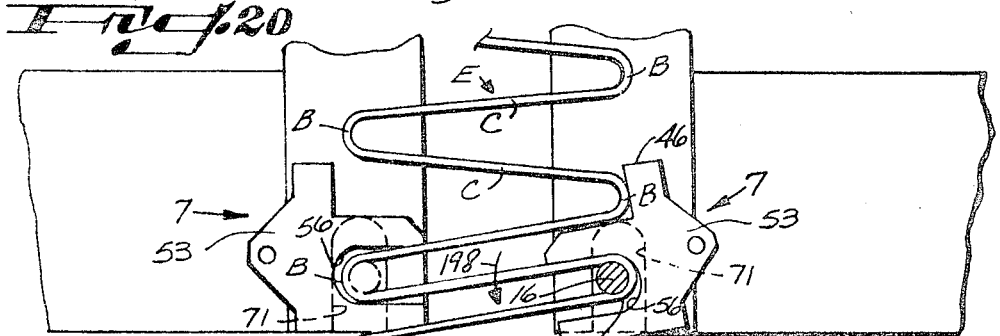

United States Patent Office 3,464,463
Patented Sept. 2, 1969

3,464,463
APPARATUS FOR FORMING WIRE STOCK
Thomas J. Dull, Fairfield, and Clifford Goldmeyer, Cincinnati, Ohio, assignors to The J. R. Greeno Company, Cincinnati, Ohio, a corporation of Ohio
Filed May 29, 1967, Ser. No. 642,076
Int. Cl. B21f 1/04
U.S. Cl. 140—105                                    13 Claims

ABSTRACT OF THE DISCLOSURE

The invention is embodied in a machine having a pair of laterally spaced vertical forming plungers or mandrels which reciprocate alternately along their vertical axes and which also reciprocate alternately in a horizontal plane. The plungers coact with a shuttle which reciprocates in a horizontal plane relative to the plungers and which also oscillates or swings through an arc of approximately 180° at the end of each horizontal reciprocation in time with the compound movements of the plungers. The shuttle includes a series of parallel bores through which straight lengths of wire stock are advanced from a source of supply, such as a reel or reels located outwardly from the apparatus. The lateral spacing of the plungers or mandrels determines the amplitude, that is, the width of the formed sinuous wire.

---

This invention relates to a machine for forming straight lengths of wire or rod stock into a sinuous or zigzag formation and to the method utilized in forming the stock. The formed wires or rods may be welded in as part of a metal reinforcing cage for concrete products, such as roadway culverts or sewer pipes. The formed wire stock may also be used in zigzag spring products for furniture, such as box springs, seating units and other cushion or spring units.

The arrangement is such that, at a given point in the cycle, the shuttle resides at one limit of its stroke, and the plunger at that side of the machine advances and descends to a bending position in front of the wires which pass through the swinging end of the shuttle. Thereafter, the shuttle swings in its arc about an axis at or near the axis of the plunger so as to bend the wire stock about the lowered plunger, then reciprocates bodily to its limit of motion from the first plunger to feed the straight wire stock to a point extending across the horizontal path of motion of the second plunger. At this point, the second plunger advances, then descends to a position in advance of the straight wires. Thereafter, by its oscillating and reciprocating motion, the shuttle carries out the next bending operation, with respect to the second plunger, such that the sinuous wires are formed continuously during sustained compound movements of the plungers and shuttle.

After the wires initially are formed by the compound movements of the forming plungers and shuttle, the final shape is imparted by a pair of corrector heads, one for each plunger. The corrector heads embrace the bight portion of the wires while they are still wrapped about the forming plungers, utilizing the plungers as dies or mandrels to impart the final sinuous shape to the wires.

OBJECTIVES

One of the primary objectives of the invention has been to provide an apparatus for forming a plurality of straight lengths of wire or rod stock to a sinuous form concurrently, such that the production of the sinuous wire is carried out in a rapid efficient manner.

According to this aspect of the invention, each forming plunger comprises a slide block shiftable in a horizontal path, the plunger or mandrel being shiftably confined in the forward portion of the slide block, with individual power means connected to each slide block and to each plunger for reciprocating the two slide blocks alternately in the horizontal plane and for reciprocating the plungers alternately along their vertical axes.

The shuttle mechanism, through which the multiple straight wire stock is fed to the plungers, is supported on a carriage which reciprocates the shuttle in its horizontal path with reference to the axes of the laterally spaced forming plungers. As noted above, the shuttle, at opposite ends of the range of carriage motion, oscillates or swings about a center coinciding approximately with the vertical axis of the plungers, the sinuous or zigzag formation being imparted initially to the wire or rod stock by the compound reciprocating movements of the plungers, combined with the compound reciprocating and swinging movements of the shuttle.

A further objective of the invention has been to provide a simplified, efficient arrangement of corrector heads which are shiftable in time with the compound reciprocating movements of the forming mandrels or plungers and adapted to bend the sinuous wires individually to their final sinuous configuration as the wires are advanced stepwisely through the machine.

As a given length of straight wire is bent about one of the lowered plungers by the swinging motion of the shuttle through its arc generally about the axis of the plunger, the curved portion or bight necessarily is bent beyond its elastic limit in order to take a permanent set. However, the bight, as initially formed about the plunger, springs outwardly upon release by the shuttle, such that the straight portions or reaches spring to a diverging relationship by reason of the residual spring action of the bight.

In order to bring the zigzag wire lengths or reaches to a more nearly parallel relationship after the bight is initially formed by the swinging motion of the shuttle, and while still wrapped about the forming plunger, the bight portions are engaged by the corrector head which is associated with that forming plunger. The corrector head reciprocates in a vertical plane and includes fork elements, one for each wire, each fork element having its open end facing the plunger about which the wire is wrapped. The corrector head and its fork elements, as a unit, is shiftable into a position embracing the bight portions which are wrapped about the plunger. Each fork element reforms the bight upon being advanced and again bends each wire beyond its elastic limit, wherein the diverging reaches or straight wires of the zigzag formation are brought into parallel relationship. The corrector head immediately retracts thereafter, and the reaches of wire again spring to a slightly diverging relationship; however, the divergence of the reaches is reduced to a few degrees beyond a parallel relationship, the diverging formation being compatible with the intended purpose of the sinuous wires.

As noted above, the machine is designed to form a series of straight wires concurrently to the zigzag formation. In the present example, the suttle is arranged to handle a series of five lengths of wire stock. In order to act upon each individual length of wire stock, each corrector head includes five fork elements, one for each length of wire stock, and spaced apart one above the other in planes corresponding to the planes of the wires which issue from the swinging end of the shuttle. The fork element are pivotally mounted in the respective corrector heads and are thus free to float, within limits, as the corrector heads force their fork elements into embracing relationship about the bight portions of the wires which are newly bent about the plungers by operation of the shuttle.

In order to improve the bending action, both during the initial formation of the bight and during the final correction, the forming plungers are also free to float along their horizontal planes as the wire stock is wrapped alternately about the lowered plungers. The floating action also prevails as the fork elements of the corrector heads advance into the forming position to embrace the wires after the initial forming operation.

Still another objetctive of the invention has been to provide a wire or rod forming machine in which the amplitude, that is, the width or reach of the zigzag formation may be varied, so as to enable the machine to produce sinuous wires having required characteristics for the reinforcing cage into which the wires are incorporated.

In accordance with this aspect, the forming plungers are shiftably mounted on the base of the machine in a manner which permits the lateral spacing of the plungers to be changed in accordance with the required amplitude of the sinuous wires. The range of lateral reciprocation of the carriage along which the shuttle is pivoted is also variable, such that the reciprocating stroke of the shuttle (but not its arc of oscillation) may be changed to correspond with the center-to-center spacing of the forming plungers.

In the present disclosure, the coordinated movements of the forming plungers and shuttle are brought about by individual power cylinders operated under hydraulic pressure, although air pressure may also be utilized. The timing of the operating cycles, and the speed of sustained operation, is regulated by a variable speed cycle control motor driving a system of cams (one for each power cylinder), which in turn operate the contacts of a series of electrical switches. The hydraulic system includes electrically operated reversing valves, one for each power cylinder, the electrically operated valves being interconnected with the switches so as to admit and exhaust fluid pressure to the several cylinders in proper sequence.

The various features and advantages of the invention will be more clearly apparent to those skilled in the art from the following description, taken in conjunction with the drawings.

In the drawings:

FIGURE 3 is a top plan of the machine as viewed along the line 3—3 of FIGURE 2.

FIGURE 4 is an enlarged fragmentary view of the plunger and shuttle mechanism taken from FIGURE 1, showing the forming plungers reversed from the position of FIGURE 1 during the cycle of operation.

FIGURE 5 is an enlarged fragmentary sectional view taken along the line 5—5 of FIGURE 1, with parts broken away, further illustrating the wire bending and forming components of the machine.

FIGURE 6 is an enlarged fragmentary sectional view, taken along the line 6—6 of FIGURE 1, illustrating the power cylinder and slide mechanism of one of the reciprocating plungers which carry out the primary bending operation.

FIGURE 7 is an enlarged fragmentary front elevation, as viewed generally along the line 7—7 of FIGURE 2, illustrating the power cylinder and driving mechanism which reciprocates and oscillates the shuttle of the machine.

FIGURE 8 is an enlarged fragmentary sectional view, taken along the line 8—8 of FIGURE 7, further illustrating the mechanism which reciprocates and oscillates the shuttle in time with other components of the machine.

FIGURE 9 is an enlarged fragmentary top plan view taken along the line 9—9 of FIGURE 7, with parts removed, further illustrating the shuttle actuating mechanism of the machine.

FIGURE 10 is a diagrammatic view similar to FIGURE 7, with the shuttle in its right-hand position, but with the left-hand forming plunger in its lowered position at the beginning of the wire forming operation.

FIGURE 11 is a diagrammatic plan, as viewed along line 11—11 of FIGURE 10 further illustrating the relationship of the parts at this stage of the operating cycle.

FIGURE 12 is a diagrammatic view similar to FIGURE 10 showing, however, the oscillating or swinging motion of the shuttle toward the left at the start of the wire bending cycle.

FIGURE 13 is a diagrammatic plan, as viewed along the line 13—13 of FIGURE 12.

FIGURE 14 is a diagrammatic front elevation, similar to FIGURE 10 showing the relationship of the parts after completion of the swinging motion of the shuttle to the left and with the shuttle shifted bodily to the left at the completion of the wire bending operation about the right-hand plunger.

FIGURE 15 is a diagrammatic plan, taken along the line 15—15 of FIGURE 14 illustrating the relationship of the parts at the stage of operation shown in FIGURE 14.

FIGURE 16 is a diagrammatic elevational view, similar to FIGURE 10, showing the left-hand forming plunger in its lowered position at completion of the bending cycle of FIGURE 15.

FIGURE 17 is a diagrammatic view taken along the lines 17—17 of FIGURE 16, further illustrating the relationship of the parts at the stage of operation shown in FIGURE 16.

FIGURE 18 is a diagrammatic front elevation similar to FIGURE 10, showing the right-hand forming plunger in its lowered position, with the right-hand corrector head in the retracted position.

FIGURE 19 is a diagrammatic plan, taken along the line 19—19 of FIGURE 18, further illustrating the relationship of the parts as the right-hand plunger and corrector assembly are retracted.

FIGURE 20 is a diagrammatic front elevation illustrating the relationship of the parts during the right-hand swinging motion of the shuttle at the beginning of the next wire forming operation.

FIGURE 21 is a diagrammatic plan, taken along the line 21—21 of FIGURE 20, illustrating the relationship of the parts as the shuttle begins its swinging motion in the right-hand direction, with the wires looped about the left-hand plunger.

FIGURE 22 is a plan view of one of the finished sinuous wires after the primary forming and correcting operations and showing the wire at a scale corresponding to that of FIGURES 10–21. This view illustrates, by way of example, the amplitude of the sinuous wire with the machine components adjusted to a minimum spacing.

FIGURE 23 is a view similar to FIGURE 22, illustrating the amplitude of the sinuous wire with the machine components set to their maximum spacing.

GENERAL ARRANGEMENT

Figure 1:
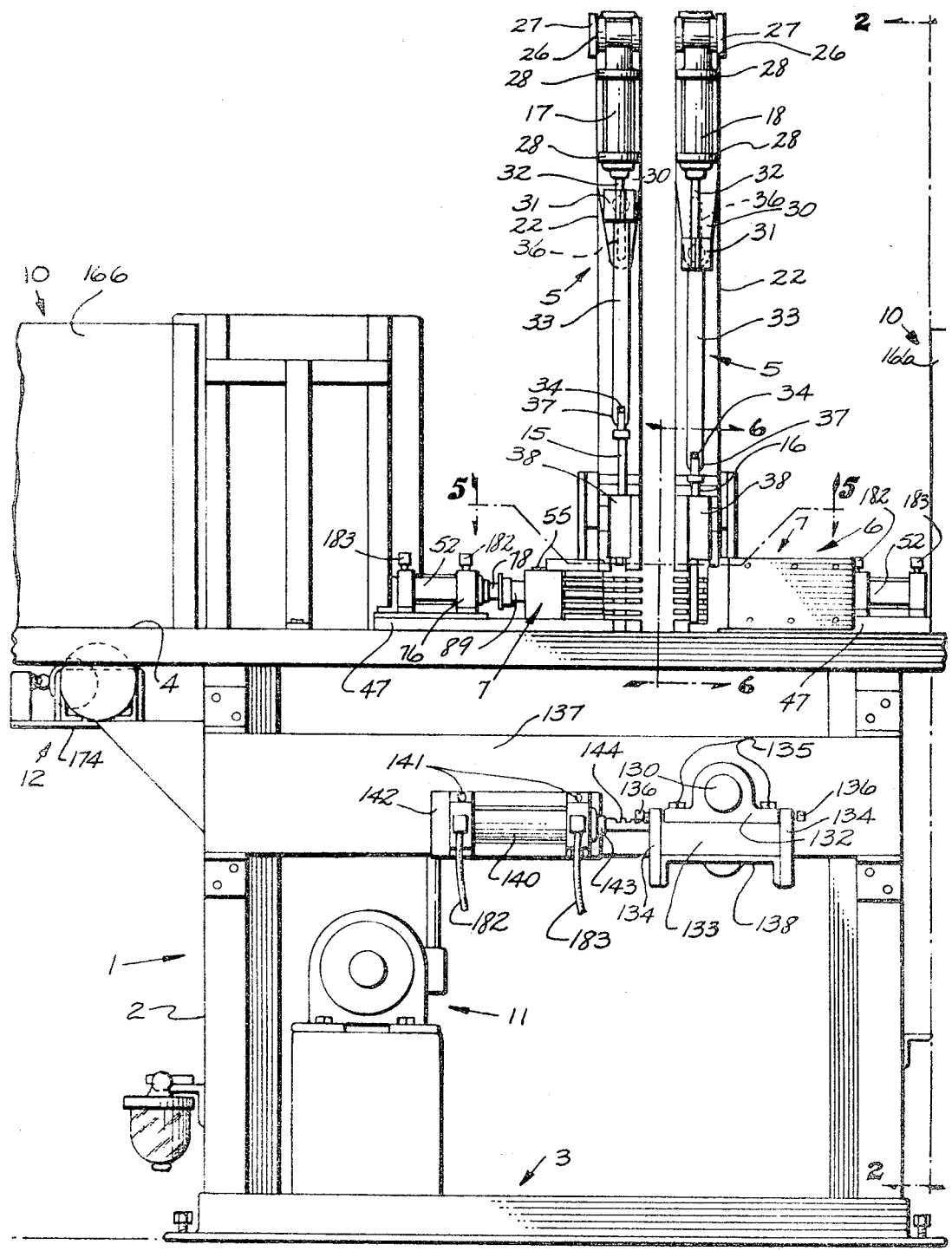
FIGURE 1 is a front elevation of a wire or rod forming machine constructed in accordance with the principles of the invention and showing the general arrangement of the components.
Figure 2:
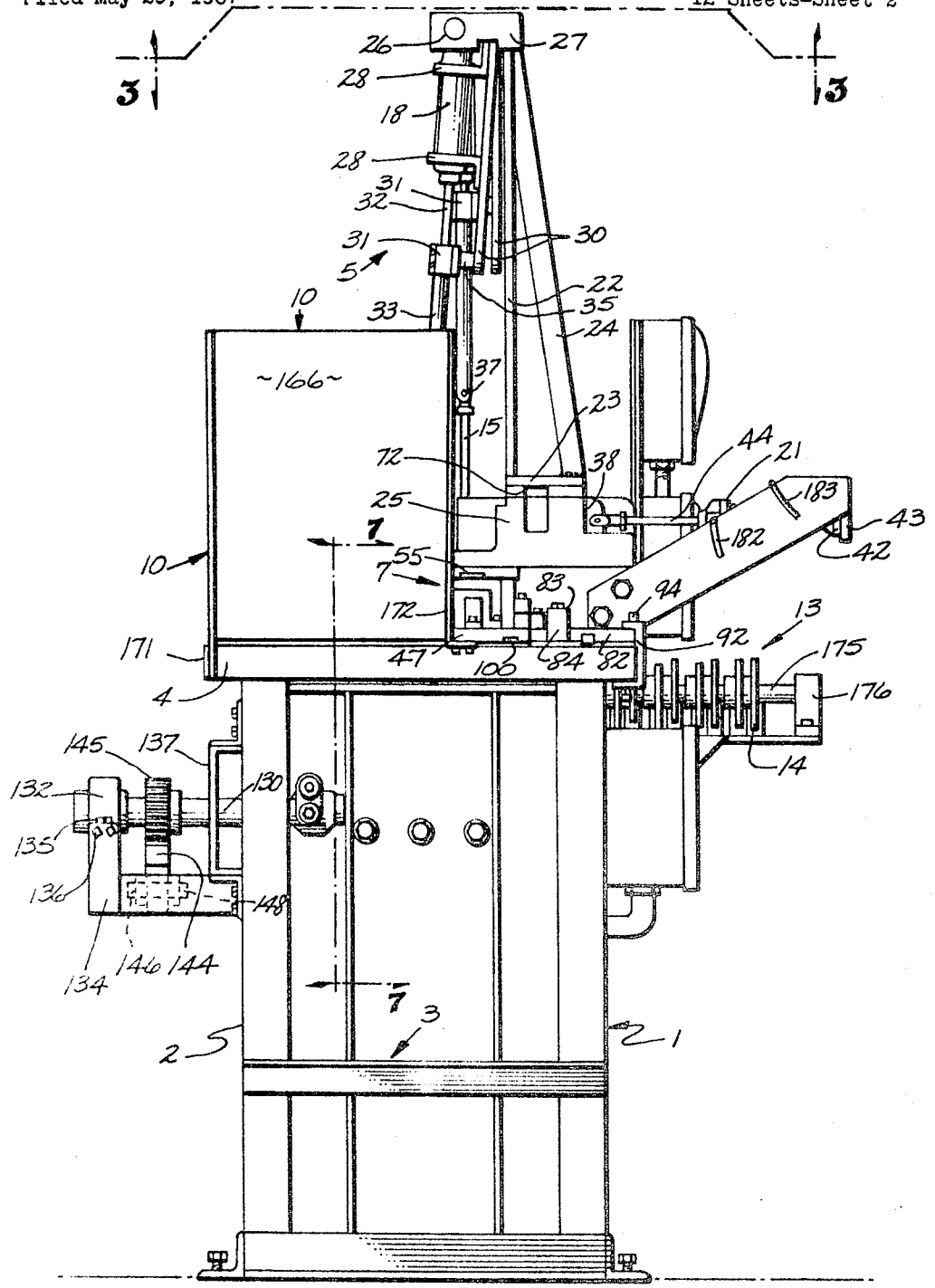
FIGURE 2 is an end elevation of the machine as viewed along the line 2—2 of FIGURE 1.

Referring to FIGURES 1–3, disclosing a machine which has been selected to illustrate the principles of the invention, there is provided a base, indicated generally at 1, upon which the several components of the machine are mounted. In general, the base 1 comprises a frame including legs 2 resting upon the floor formed of structural steel and reinforced, as indicated generally at 3. A table 4 is mounted upon the upper ends of the legs 2, the table being located at an elevation convenient to the operator. Table 4 comprises a sheet metal panel, with the forming mechanism supported rigidly with reference to the table surface by means of steel members which form a part of the reinforcing structure 3.

In general, the forming mechanism comprises a pair of plunger assemblies, indicated generally at 5—5, including plungers or mandrels which reciprocate along vertical axes and which also reciprocate in a horizontal plane, as explained later. The plungers are actuated in time with one another, and in time with the other components of the machine by individual fluid power cylinders, the operation of the cylinders being regulated by an electrical control system.

The actual bending or forming operation is carried out by a shuttle mechanism, indicated generally at 6, through which the wires or rods A (FIGURE 3) are advanced in straight formation from a source of supply, such as a plurality of reels (not shown) which are located outwardly at a point remote from the front of the machine. In the present example, the supply reels are located in a fixed position; however, the straight lengths of wire A, by reason of the outward location of the supply reels, are free to flex during the combined oscillating and reciprocating movements of the shuttle during the wire forming operation.

As shown in FIGURE 7, the machine is designed to form or bend a series of five wires or rods A simultaneously upon each cycle of operation. In this example, the straight lengths of wire A are fed from reels, which, as noted, are located outwardly from the machine to accommodate the compound movements of the shuttle mechanism 6.

Briefly, in bending or forming the straight wires A to their zigzag shape, as described later with reference to FIGURES 10–21, the straight wires A are initially bent around the plungers or mandrels of the two plunger assemblies 5 by the compound movements of the shuttle 6 coacting with the compound vertical and horizontal movements of the plungers of the assemblies 5—5. At the start of a given cycle, for example, as shown in FIGURES 5 and 6, the shuttle 6 resides to the right, with the plunger of the right-hand assembly 5 lowered in position and located forwardly of the straight wires A. During the bending cycle, the shuttle 6 swings in its arc of motion through an angle of approximately 180° toward the left about the right-hand plunger so as to bend the wires about the right-hand plunger, thus forming the initial bight B. The shuttle 6 then shifts bodily toward the left; thereafter, the plunger of the left-hand assembly 5 is lowered forwardly of the wires A (FIGURES 16 and 17) ready to form the left-hand bight B by the swinging motion of the shuttle toward the right, as indicated in FIGURES 20 and 21.

The compound, coordinated movements of the plungers and shuttle are sustained, such that the shuttle advances along the straight wires A during the bodily reciprocation of the shuttle after each swinging motion to create a given bight B. It will be seen that the straight wires A are thus drawn from the reels intermittently during the alternate swinging movements of the shuttle after its bodily reciprocating movement.

As shown in FIGURES 4–6, the initial forming or bending operation, which is carried out by the compound movements of the plunger assemblies 5—6 and shuttle 6, produce open zigzag formations comprising the bights B which are joined by the straight sections or reaches C. As each alternate reach C is formed, the zigzag formation is indexed rearwardly as a result of the rearward reciprocation of the plunger about which the wire is bent.

As the plungers, which embrace the newly bent wires are reciprocated rearwardly, the bight B is engaged by one of a pair of corrector heads, indicated generally at 7, which is associated with the active plunger. The corrector heads 7—7, for reasons explained later, complete the formation of the bight B by increasing the degree of curvature, so as to bring the wire to its final sinuous configuration.

It will be understood at this point that the amplitude of the sinuous wire, that is, the distance across the bights B, as indicated at D in FIGURES 22 and 23, may be varied, as required by adjusting the spacing between the plunger assemblies 5—5 and by making a corresponding change in the range of reciprocation of the shuttle 6 and corrector heads 7. As explained later in the detailed sections of this specification, these components include adjustment means, whereby the change in amplitude may be carried out conveniently and quickly.

The range of amplitude of the sinuous wires, as provided by the adjustment of these components, is shown diagrammatically in FIGURES 22 and 23. The formed wires shown in these views are drawn to the scale of the working diagrams illustrated in FIGURES 10–21. The minimum amplitude D, indicated in FIGURE 22, represents the formation of the wires with the plunger assemblies adjusted to their minimum center-to-center spacing, with the location of the corrector heads 7 corresponding to the adjustment and with the range of the reciprocation of the shuttle 6 also correspondingly adjusted. The maximum amplitude, indicated in FIGURE 23 is produced with the plunger assemblies 5 and the corrector heads 7 adjusted to their maximum spacing, with a corresponding increase in the range of reciprocation of the shuttle.

Upon each cycle of operation, that is, one oscillation and reciprocation of the shuttle 6, one of the initial zigzag bends or bights B is formed, then, as explained later, the plunger of the assembly 5 about which the bend B is formed, reciprocates rearwardly. The alternate vertical and horizontal reciprocations of the two plungers advances the formed wire in stepwise stages rearwardly through the machine.

As the formed sinuous wires advance rearwardly through the machine and beyond the table 4, the finished sinuous wires E advance across a table extension, indicated at 8 (FIGURE 3) which extends rearwardly for a distance to support the finished wires E to their full length as required by the cylindrical pipe reinforcing cages for which they are intended. The forming machine preferably includes a cut-off mechanism (not shown) mounted at or near the rearward end of the table extension 8 arranged to sever the finished wires E to the required length.

As the shuttle 6 swings through its 180° arc of motion at opposite limits of reciprocation, the straight wires A, which feed from the reels to the swinging end of the shuttle, are caused to whip across the front of the machine. To control the whipping action, the machine is provided with a pair of guards 10—10 (FIGURE 3) at opposite ends of the table which diverge outwardly from one another. As the straight wires A whip across the table and floor area, they strike alternately against the guards 10, which thus control the whipping action as a protective measure.

In the present example, the shuttle 6 is provided with five wire guide apertures extending parallel with one another from the outer or swinging end of the shuttle to its inner end, the guide apertures adapted to feed five lengths of wire A concurrently across the plungers or mandrels during each forming operation. It will be understood that the machine may be arranged to handle a greater or smaller number of straight wires, utilizing the operating principles disclosed herein.

Generally speaking, the several components of the machine are operated by cylinders, which may be powered by air pressure or hydraulic pressure. In the present example, the power cylinders are operated under hydraulic pressure, the system being supplied by a hydraulic power unit of conventional design, indicated at 11 in FIGURE 1. In general, the hydraulic system is controlled by a variable speed cycle control motor, indicated generally at 12, (FIGURES 1 and 3) the speed of which regulates the cycles of operation of the several components. The system includes an electrical control circuit having reversing valves (not shown) interposed in the hydraulic conduits of the power cylinders. The operation of the electrically operated reversing valves is regulated by respective pairs of micro-switches 13 (FIGURES 2 and 3) which are actuated by companion pairs of cams 14 rotated by the cycle control motor 12.

PLUNGER ASSEMBLY

As shown generally in FIGURES 1–3, each plunger assembly 5 includes a plunger or mandrel, the two being indicated at 15 and 16. The plungers are reciprocated vertically in time with one another and are also shifted in a horizontal plane in time with the vertical reciprocations. The plungers, in the present example, are reciprocated vertically by the power cylinders 17 and 18 (FIGURE 1) and are reciprocated in the hozirontal plane by the power cylinders 20 and 21 (FIGURE 3).

The cylinders 17 and 18, for vertical reciprocation are mounted upon the upper portion of respective standards 22–22 (FIGURES 1 and 2) in the form of bars, the lower ends of the bars being secured by welding to respective base plates 23 (FIGURES 2 and 6). Each standard 22 is reinforced against deflection by a respective diagonal brace 24, each brace having its lower end secured by welding to the base plate 23 and having its upper portion welded to the standard 22.

Each base plate 23 is secured to a mounting block 25 which, as explained later, is arranged for lateral adjustment with reference to the table 4 (FIGURE 3) whereby the spacing of the plungers 15 and 16 may be varied to regulate the amplitude D of the sinuous wire. It will be understood, at this point, that each plunger assembly comprises a self-contained unit, including a respective corrector head 7, such that an adjustment in the spacing of the plungers or mandrels 15 and 16 brings about a corresponding change in the location of the corrector heads 7—7.

As best shown in FIGURES 1 and 2, the vertical cylinders 17 and 18 each have an upper end pivotally connected as at 26 to the upper end portion of its vertical standard 22, the pivots passing through lugs 27 which are welded to the upper end portion of the standard 22. The vertical cylinders 17 and 18 each include upper and lower brackets 28—28 secured to a swinging plate 30; the lower end of each swinging plate includes a guide block 31 for the piston rod 32 of the cylinder.

As shown in FIGURE 1, the piston rod 32 of each cylinder 17 and 18 projects into the guide block 31 and its lower end passes into the upper portion of a connecting rod 33. Each guide block 31 includes a guide pin 35 (FIGURE 2) projecting rearwardly and through a slot 36 formed in the swinging plate 30. The connecting rods 33 and swinging plate 30 permit the plungers 15 and 16 to be shifted axially in the horizontal plane in time with their vertical movements. For this purpose the lower end of each connecting rod 33 is slotted as at 34 (FIGURES 1 and 4) and the upper end of the plungers 15 and 16 are pivotally connected as at 37 to the slotted portion of the connecting rods 33.

In order to reciprocate the plungers 15 and 16, each plunger is slidably confined within a respective plunger slide block 38 (FIGURES 1, 3, 4 and 6), the slide blocks being mounted for reciprocation within slide ways which are formed in the mounting blocks 25. The rearward portion of each slide block 38 is connected to one of the respective horizontal power cylinders 20 or 21.

For this purpose, each power cylinder 20 and 21 has its rearward end pivotally connected as at 41 (FIGURES 3 and 6) to a lug 42 which is attached to a bracket 43 projecting rearwardly from the mounting block 25. The mounting blocks 25 also support the vertical standards 22 upon which the vertical plunger cylinders 17 and 18 are mounted, as noted earlier. The piston rod 44 of each horizontal cylinder 20 and 21 includes at its forward end a clevis 45 which is pivotally connected as at 40 to the rearward portion of the horizontal slide block 38 which guides the vertical plungers 15 and 16.

The coordinated operation of the pairs of vertical cylinders 17 and 18 and the horizontal cylinders 20 and 21 thus shift the plungers or mandrels 15 or 16 along their vertical axes and also in the horizontal plane, as described later in the description of operation. As explained below, each plunger assembly 5, consisting of the plungers 15 and 16, their vertical cylinders 17 and 18 and the horizontal cylinders 20 and 21 are adjustable as a unit by shifting the mounting blocks 25—25 laterally with respect to one another relative to the table 4 so as to regulate the spacing between the plungers 15 and 16.

CORRECTOR HEADS

As noted in a general way previously, the opposed corrector heads 7—7 act upon the alternate bight or curved portion B of the sinuous wires after the straight wires A have been formed primarily by the plungers 15 or 16, which are associated with the respective corrector heads 7—7. It will be understood at this point that the corrector heads normally reside in a retracted position to permit the alternate reciprocation of the plungers 15 and 16 in the horizontal plane during the forming operation.

Generally speaking, as a given plunger shifts rearwardly, in its lowered position, after the shuttle 6 has bent the wires about the lowered plunger, the corrector head 7, which is associated with that plunger, shifts forwardly from its retracted position to carry out the correcting action while the bights B are backed or wrapped about the plunger. In other words, each corrector head acts in the manner of a forming die with respect to the bights B which are supported by the plunger during the correcting procedure.

Described in detail (FIGURES 4–5), each corrector head 7 comprises a corrector slide block 46 mounted for reciprocating motion in a horizontal plane along a respective guide plate 47. The guide plates 47, in turn, are mounted upon the top surface of table 4 and are secured to the reinforcement structure 3 of the base 1 for rigidity.

As viewed from above (FIGURE 5), each corrector slide block 46 is generally U-shaped, having a slot 48 delineated by a base section 50 to which is joined a pair of parallel arms 51—51. It will be understood at this point that each corrector slide block 46 is reciprocated in its horizontal plane by an individual power cylinder 52, which is mounted upon the guide plate 47 of that slide block.

Each corrector slide block 46 includes a group of fork elements 53 (FIGURES 4, 5 and 6) pivotally mounted as at 54 within a fork mounting block 55 which is interfitted within the slot 48 of the corrector slide block 46. The purpose of this arrangement is to permit the fork elements 53 to float in the horizontal plane and also to be adjusted as a group within minor limits with respect to the corrector slide block 46, as described later.

As viewed in FIGURE 4, the fork elements 53 are five in number, one for each of the five straight wires A, and are in the form of flat plates. The fork elements are located one above the other in planes corresponding with the planes of the straight wires A as the wires pass through the guide apertures of the shuttle 6.

As best shown in FIGURE 5, each fork element 53 is generally U-shaped, providing a recess 56 having a width slightly greater than the outside diameter of the bight B which it is to correct. The recess 56 is delineated by a pair of tines 57—57 projecting outwardly from the body 58 of the plate which forms the fork element 53 and through which the pivot pin 54 passes. It will be noted (FIGURE 4) that the opposite ends of the pivot pin 54 are confined in the fork mounting block 55.

It will be noted in FIGURE 5 that the body 58 of each fork element includes a pair of shoulders 60—60. A clearance 61 exists between the shoulders 60 and the ends of the arms 51 of the corrector slide block 46. This clearance permits the fork elements to float laterally and individually, within limits, about the pivot pin 54 as the fork elements embrace the bight portion B of the partially formed wires about the plungers 15 or 16, as described later with reference to the diagrams of FIGURES 10–21.

As best shown in FIGURES 4 and 5, each fork mounting block 55 has its forward portion slotted as at 62, one slot being provided for each fork element 53. The slots 62 delineate fingers 63, the fork elements 53 being interfitted in the slots 62 and spaced in their respective planes by the fingers 63. The pivot pin 54 passes through the fork elements 53 and fingers 63 collectively.

The clearance 61 between the shoulders of the fork elements 53 and corrector slide block 46 may be varied in order to regulate the degree of floating action, thereby to compensate for variable factors, for example, the size of the wires A, the resiliency of the wires, or the degree of correction which is to be applied to the bight portions B. The variation in the clearance 61 is brought about by shifting the fork mounting block 55 with respect to the corrector slide block 46 within the slot 48 (FIGURE 5).

In order to bring about this adjustment, the corrector slide block 46 is slotted as at 64 at opposite sides (FIGURE 4) with a spacer 65 fitted within each slot. The spacer 65 is secured in place by a screw 66 within the slot, the arrangement being such that the spacer 65 locates the fork mounting block 55 within the corrector slide block 46. When it is necessary to change the clearance 61, the screw 66 is removed and the spacer 65 is replaced with one having a different length so as to relocate the fork mounting block 55 with respect to the corrector slide block 46, thereby changing the clearance 61.

A bridge plate, described later and indicated at 75, overlies the corrector slide block 46 and fork mounting block 55 for confining the block assembly (corrector head 7) during reciprocation. It will be understood at this point that the construction described above is identical for each of the corrector heads 7—7.

As noted earlier, the sinuous wire E (FIGURE 5), as it is formed, is indexed rearwardly in stepwise fashion by operation of the reciprocating plungers 15 and 16 after having been acted upon by the corrector heads 7—7. The lengths of formed wires E are guided rearwardly in the same planes at which they previously had been acted upon by the fork elements 53, by means of respective stationary wire guides extending rearwardly from each corrector head.

As shown in FIGURES 5 and 6, each wire guide is in the form of a one-piece block 67 having machined in its inner face a series of horizontal slots 68 which delineate spaced parallel guide rails 70, the slots 68 being sufficiently deep to receive the bight portions B of the formed wires E, as indicated in FIGURE 5.

The slots 68 of the wire guide block 67 are of substantially the same width as the slots 62 of the fork mounting block 55, the two sets of slots being aligned horizontally with one another. Thus, as shown in FIGURES 4 and 5, the end portions of the fork elements 53 project outwardly and partially within the slots 68 of the stationary wire guide block 67, when the fork elements are in their retracted position. In order to provide clearance for the fork elements as they are advanced to the extended active position (FIGURE 5), the end portion of the guide block 67 is slotted transversely as at 69.

The forward, transversely slotted end portion of the wire guide block 67 further includes U-shaped recesses 71 (FIGURE 5) which provide clearance for the plungers 15 and 16 as they index rearwardly to locate the bight B in alignment with the fork elements 53 of the corrector heads 7. The arrangement is such that the bight portion B, during correction, is confined within the angularly related recesses 56 of the fork element and recess 71 of the wire guide block 67, as shown in FIGURE 11.

The wire guide blocks 67 extend rearwardly across table 4 to the table extension 8. After leaving the wire guide blocks 67, the formed wires curve downwardly by gravity and rest upon one another during rearward stepwise advancement across the table extension 8. It will be noted in FIGURE 6 that the mounting block 25 which includes a way confining the slide block 38 of the forming plunger is mounted directly upon the wire guide block 67 by suitable means (not shown). However, in the alternative, the block 25 and the wire guide block 67 may be formed as a single unit.

As shown in FIGURE 6, spacers 72 extend transversely across the top surface of mounting block 25 to confine the plunger slide block 38 within its slide way. The spacers 72 support the base plates 23 of the standards 22 upon which the vertical plunger cylinders 17 and 18 are mounted.

By virtue of this arrangement, the plunger assembly 5—5 and the wire guide blocks 67 may be adjusted laterally relative to one another as self-contained units when the amplitude D of the finished wire E is to be changed (FIGURES 22 and 23). Since the corrector heads 7—7 remain in fixed relationship to the wire guide blocks 67—67 and plunger assemblies 5—5, the corrector heads are also connected to the wire guide blocks 67. In other words, each plunger assembly 5, associated corrector head 7 and wire guide block 67 may be shifted laterally as a self-contained unit upon lateral adjustment, as explained below.

The corrector heads 7, consisting of the corrector slide blocks 46 and the fork mounting blocks 55, as a unit, are mounted for reciprocation upon the guide plate 47, the reciprocating motion being imparted to these respective assemblies by the cylinders 52. The reciprocation of the corrector heads 7 is timed with the horizontal and vertical reciprocations of the plungers 15 and 16 by operation of the cam-operated micro-switches 13 which, as noted earlier, control the operation of the several components of the machine.

As best shown in FIGURES 2, 4 and 5, the corrector heads 7 (corrector blocks 46) are guided for reciprocation upon the respective guide plates 47 by means of an overhanging bracket 73 which is in the form of an upright member rising from the guide plate 47 and having a horizontal bridge plate 75 which overhangs the corrector head 7. The horizontal bridge plate 75 slidably confines the corrector block 46 in its horizontal plane of reciprocation with respect to guide plate 47. It will be understood that this construction is duplicated for each of the corrector heads 7—7.

The horizontal cylinders 52—52, which reciprocate the corrector heads 7—7, are each carried by brackets 76—76 which are secured by screws 77 (FIGURES 3, 4 and 5) to the guide plate 47 of the respective corrector head 7. Each power cylinder 52 includes a piston rod 78 connected to the slide block 46 of the corrector heads 7, each piston rod 78 includes an adjustable coupling 80 interposed between the piston rod 78 and the stud 89 which projects from the corrector head 7.

ADJUSTMENT MECHANISM (Plunger assemblies and corrector heads)

As noted earlier, the plunger assemblies 5—5 and the corrector heads 7—7 are adjustable laterally in a horizontal plane with reference to the table 4 in order to vary the amplitude D of the sinuous wires within the range indicated in FIGURES 22 and 23. In the present example, the plunger assemblies 5 and corrector heads 7 are adjustable as self-contained units since the relationship of these mechanisms remains constant within the range of adjustment.

It will be understood at this point, that the range of reciprocation of the shuttle 6 is changed to correspond with the spacing of the plungers 15 and 16 and the corresponding spacing of the corrector heads 7, since the shuttle performs the bending operation about the plungers at their selected spacing. The shuttle adjustment mechanism is described later with reference to the shuttle actuating mechanism.

Described in detail (FIGURES 2, 3, 5 and 6), each plunger assembly 5—5 is mounted for adjustment upon the mounting block 25, the base plates 23 of the assemblies 5 being secured to the mounting blocks 25, as explained earlier. Each block 25, in turn, is carried upon the wire guide block assembly 67 which provides the guide slots 68 extending rearwardly from plungers 15 and 16 and from the corrector heads 7—7.

Each wire guide block 67 is carried upon a fixed adjustment plate 81 which rests upon a reinforcement plate 82 mounted with reference to the framework 3 of the machine to provide a firm foundation for the plunger assemblies 5—5 and corrector heads 7—7. The fixed adjustment plate 81 is bolted to the reinforcement plate 82. A clamping bridge 83 has a foot 84 at one end seated upon the fixed adjustment plate 81. The opposite end of the clamping bridge includes a second foot 84 seated upon the mounting block 25 of the wire guide block 67 and plunger assembly 5.

The mounting block 25 of the plunger assembly 5, as noted earlier (FIGURE 5) rests upon the fixed adjustment plate 81 which is bolted as at 85 to the reinforcement plate 81. In order to provide the adjustment, the fixed adjustment plate 82 is provided with a series of spaced holes (FIGURE 5) which are threaded to receive the clamping screw 86. The clamping screw 86 passes through a slot 87 formed in the clamping bridge 83 and into threaded engagement with a selected hole 88 of the fixed plate 82.

The threaded holes 88 are located at a spacing equal to or less than the length of slot 87. By virtue of this arrangement, the clamping bridge 83, together with the mounting block 25 of the plunger assembly 5 is free to be adjusted along the entire range delineated by the spaced clamping holes 88. The clamping bridge 83 permits the mounting block 25 and its plunger assembly to be adjusted accurately to any position within the range provided by the spaced clamping holes 88. Thus, in making a minor adjustment from the position shown in FIGURE 5, the clamping screw 86 is loosened sufficiently to relieve the pressure on the clamping bridge 83, then the base 25 and plunger assembly 5, as a unit, is shifted to the desired position. Thereafter, the clamping screw 86 is tightened to lock the assembly 5 in its selected position.

In making a major adjustment, the clamping screw 86 is removed, then the plunger assembly 5 is shifted outwardly, for example, from the position shown in FIGURE 5 to a new position with reference to locating holes 88. The clamping screw 86 is then slipped through the slot 87 of the bridge 83 and is threaded to the nearest locating hole 88. The plunger assembly 5 is then adjusted to its final position and the clamping screw 86 is tightened to clamp it in place.

In order to hold the plunger assemblies 5—5 in proper alignment with one another, each mounting block 25 (FIGURE 5) includes an elongated guide bar 90 having one end portion rigidly secured to the mounting block 25 of the plunger assembly 5. The elongated guide bar 90 slidably interfits a guideway 91 formed in the upper surface of the reinforcement plate 82, such that the guide bar 90 acts as a key during the lateral adjustment of the plunger assemblies. It will be understood that the guideways 91 of both plunger assemblies 5 are located in transverse alignment, which is preserved upon adjustment.

In addition to the clamping bridge 83, each plunger assembly 5 is further stabilized in its adjusted position by means of a generally C-shaped clamp 92 (FIGURES 2, 3 and 5). The C-shaped clamp has a lower end portion engaged about the lower surface of table 4. The upper end portion of the C clamp 92 overhangs the rearward portion of the mounting block 25 and thus coacts with the clamping bridge 83 in stabilizing the assembly. The upper portion of clamp 92 includes a clamp screw 94, which bears upon the mounting block 25 (FIGURES 2 and 5).

As noted earlier, the corrector heads 7—7, upon adjustment, are shifted in unison with the plunger assemblies 5—5. Also, as noted earlier, the power cylinders 52—52 which actuate the corrector heads 7—7, are mounted in common upon the respective guide plates 47—47 of the corrector heads. In order to shift the corrector heads 7 in unison with the plunger assembly 5, a connector bar indicated generally at 95, joins the base plate of each corrector head to the mounting block 25 of each plunger assembly (FIGURE 5). Connector bar 95 includes a foot 96 secured by a screw 97 to the mounting block 25. A screw 98 secures the bar portion of the connector to the guide plate 47 of each corrector head. A back-up bar 99 is secured to mounting block 25 by a screw 93, (FIGURE 5).

As shown in FIGURE 2, each base plate 47 is keyed as at 100 to the adjustment plate 82 upon which it rests in a manner similar to the guide bar 90 of the plunger assembly. The guide plate 47, in the present example, may be provided with C clamps (not shown) which secure the corrector heads rigidly in their position upon adjustment.

SHUTTLE CONSTRUCTION

As outlined above, the shuttle 6 coacts with reciprocating plungers 15 and 16 of the plunger assemblies 5—5 in the initial formation of the sinuous wires. In order to carry out this function, a shuttle driving mechanism, indicated generally at 101 (FIGURES 6, 7, 8 and 9) imparts a bodily reciprocation to the shuttle and the swinging or oscillating motion which is coordinated with the bodily reciprocating movements of the shuttle. Also, as noted, the shuttle 6, in the present example, is arranged to guide and bend a series of five wires A from the reels and about the reciprocating plungers 15 and 16 during each alternate operating cycle.

Referring to FIGURES 6, 7 and 9, the shuttle 6 is of split construction and comprises two plates 102—102. The inner faces of the two plates have matching grooves which, when the plates are assembled, provide the cylindrical apertures 103 through which the wires A are fed. The plates 102—102 are secured in facial engagement by screws 104 (FIGURE 7).

The assembled shuttle plates 102 are mounted upon a reciprocating and oscillating shuttle head 105 (FIGURES 5 and 7). The shuttle head 105 includes a tongue 106 projecting laterally from the head, the end portions of the shuttle plates 102 being slotted (FIGURE 5) to receive the tongue 106. The end portion of the shuttle plates 102, which interfit the tongue 106, are secured in place by screws 107 (FIGURE 7). The lower portion of the shuttle head 105 includes a hub portion 108 (FIGURES 6, 7 and 8) and a vertical rock shaft 110 (FIGURE 8) projects downwardly from hub 108 to the shuttle driving mechanism 101 so as to support and actuate the shuttle, as described later.

Described generally, reciprocating motion is imparted to the shuttle by a carriage, indicated generally at 111, which is carried for horizontal reciprocation upon a set of slide bars 112 (FIGURES 7, 8 and 9). As shown in FIGURE 8, the lower portion of the carriage 111 is carried by two lower slide bars 112 and the upper portion of the carriage is stabilized by a single slide bar 112. The upper bar 112 includes a pair of clamping blocks 113 at opposite ends which are secured to vertical support plates 114 which form a part of the framework 3 of the machine.

The parallel lower slide bars 112 are mounted in a similar manner in elongated clamping blocks 115 which are also secured to the vertical plates 114 at opposite ends of the machine. The arrangement is such that the carriage 111 and the shuttle 6, as a unit, are firmly supported during reciprocation in the horizontal plane.

Described in detail (FIGURES 7, 8 and 9) the carriage 111 comprises a slide bracket 116, having a horizontal top plate 117 which includes depending lugs 118—118. The lugs 118 include bushings 120 slidably fitted on the slide bars 112. The upper portion of the carriage 111 includes a lug 121 (FIGURES 7 and 8) having a similar bushing 120 slidably connected to the upper slide bar 112 immediately beneath the shuttle 6 so as to stabilize the shuttle counted to the forces which are developed by the shuttle in bending the wires about the plungers. As noted below, the power cylinder 122, which imparts oscillating movement to the shuttle, is mounted upon the top plate 117 of the slide bracket 116. The cylinder 122 thus moves in unison with the carriage 111 and the shuttle during the reciprocating movements.

The carriage 111 is reciprocating along the set of bars 112 by a pitman or link 123 (FIGURES 7, 8 and 9) having a free end which is pivotally connected as at 124 to a block 125 attached to the carriage 111. The block 125 is slotted as at 126 to receive the pitman 123, with the pivot element 124 passing through the slot.

The opposite end of the pitman 123 is pivotally connected as at 127 to a crank arm 128 (FIGURE 9), which swings through an arc in forward end reverse directions by operation of a power cylinder, as explained later. The arrangement is such that the throw of crank arm 128 may be varied to regulate the range of reciprocation of the carriage and shuttle in regulating the amplitude D of the formed sinuous wire.

Described in detail, the crank arm 128 forms a part of a rock shaft 130 which is rotatably journalled in spaced bearings, an inboard bearing 131 being shown in FIGURES 8 and 9 and an outboard bearing of similar construction being indicated at 132 in FIGURES 1, 2 and 3. Both bearings are carried by a bracket 133 secured to the framework of the machine and having upright lugs 134 rising from opposite ends of the bracket 133. The bearing blocks 131 and 132 are secured in place on the upright lugs 134 by screws 135 (FIGURES 1, 2, 3 and 9) passing through opposite end portions of the bearings. The upright lugs 134 further include clamping screws 136 engaging the opposite ends of the bearings 131 and 132.

As best shown in FIGURE 1, the brackets 133 project from a horizontal support plate 137 secured to the machine frame. Bracket 133 rests upon a channel iron 138, and the upright lugs 134 may be secured to the opposite sides of the channel iron, for example, by welding.

As noted, the crank arm 128 is oscillated through its arc by a power cylinder, indicated at 140 (FIGURES 1 and 3). Cylinder 140 is secured by screws 141—141 to a mounting block 142 attached to the horizontal support plate 137. The piston rod 143 of cylinder 140 includes a rack 144 (FIGURES 1, 2 and 3) which meshes with a pinion 145 keyed to the rock shaft 130.

Rack 144 is held in engagement with the teeth of pinion 145 by a roller 146 (FIGURE 2). The roller 146 is disposed within a recess formed in bracket 133 and is journalled upon a pin 148 passing through the recess. The stroke of the piston rod 143 and rack 144 may be varied in accordance with the design of the machine by means (not shown) associated with power cylinder 140. In the present example, the crank may be swung through an angle of 180° in forward or reverse directions by operation of the rack 144 and pinion 145.

In order to regulate the stroke of the carriage 111 precisely in setting up the machine for a given amplitude D, the connection of the pitman 123 to the crank arm 128 is adjusted along the length of the crank arm 128. For this purpose (FIGURES 8 and 9), the crank arm 128 includes a pitman connecting block 150 to which the end of the pitman is pivoted, as indicated previously at 127. The pitman block 150 is shifted relative to the crank arm by an adjustment screw 151 carried by and parallel with the crank arm 128 (FIGURE 9). As viewed in FIGURE 9, the adjustment screw 151 passes loosely through a lug 152 which is secured to the end of the crank arm 128. The screw 151 is held against endwise motion by its head 153 seated on one side of lug 152, with a collar 154 secured to the screw and seated against the opposite side of lug 152.

The shank portion of the adjustment screw 151 is threaded through a second lug 155 secured by welding to the pitman connecting block 150. The pitman connecting block 150 includes a lateral projection 156 which is slotted as at 157 (FIGURE 8), with clamping screws 158 passing through the lotted portion 157.

When the throw of the link or pitman 123 is to be regulated, the clamping screws 158 are loosened to permit the pitman connecting block to be shifted along the crank arm 128. The adjustment screw 151 is then turned in a direction to increase or decrease the throw, utilizing a tool which interfits the head 153 in the usual way. After the required throw is obtained, the clamping screws 158 are tightened to lock the connecting block 150 in its selected position with reference to the crank arm.

It will be understood that the adjustment mechanism is arranged to reciprocate the shuttle through a range corresponding to the center-to-center adjusted position of the plungers 15 and 16. For example, the plunger assemblies may be first be adjusted to obtain the desired amplitude, then the throw of the crank arm may be regulated to correspond to this setting.

The oscillating or swinging motion is imparted to the shuttle 6 by the power cylinder 122 carried by the carriage, as previously noted. For this purpose, (FIGURES 7, 8 and 9) a rack 160 projects from the piston rod 161 of power cylinder 122. The teeth of rack 160 mesh with a pinion 162 which is keyed to the vertical rock shaft 110 which, as described earlier, forms a part of the shuttle head 105.

The rack 160 is confined within a rack slide block 163 (FIGURES 7–9), which is slotted as at 164 to accommodate the rack 160 and its pinion 162. The slide block 163, which is attached to the carriage 111, includes a roller 165 journalled within the rack slide block 163 and bearing against the rack 160 to hold the rack teeth in mesh with the teeth of pinion 162.

From the foregoing, it will be understood that the portion of the shuttle driving mechanism 101 for imparting the swinging or oscillating motion to the shuttle 6, consists of the power cylinder 122 and the rack and pinion drive 160 and 162. These components form a self-contained part of the carriage 111. The carriage 111, in turn, is reciprocated along the slide bars 112 by the power cylinder 140 (FIGURE 3) through the rack and pinion drive 144 and 145, as explained earlier.

The operation of the two power cylinders 122 and 140 is regulated by the control system including the microswitches 13 and cams 14, as indicated earlier, such that the several power cylinders are reciprocated in time with one another in the required sequence.

During the compound movements of the shuttle 6, the straight wires A, which issue from the reel or reels, whip across the front of the machine. The guards 10, previously noted, provide a diverging working area across the table and regulate the throw of the wires. As best shown in FIGURES 1–3, each guard 10 comprises a sheet metal plate 166, rising from the table 4. The left-hand guard 10 has its inner end secured to a vertical bracket 167 including a foot portion 168 secured to table 4. The guard is reinforced by an intermediate bracket 170 and its outer end is secured to a brace 171 extending outwardly from the end of the table.

The right-hand guard 10 is adjustably mounted, being provided with a bracket 172 at its inner end which has its lower end secured to the adjustable guide plate 47 of the right-hand plunger assembly, previously described. The outer end of the right guard is secured as at 173 to the brace 171. However, in this case, a slotted connection (not shown) is provided, whereby the right guard may be shifted laterally with the guide plate 47 upon adjustment of the machine.

CONTROL SYSTEM

The control system, as noted above, regulates the sequential operation of the several components of the machine by fluid pressure, a hydraulic system being utilized in the present example, although an air pressure system may be employed instead. The operating speed of the machine is variable and is regulated by the cycle control motor 12, which is of the variable speed type (FIGURE. 3).

As best shown in FIGURE 3, the variable speed cycle control motor 12 is mounted immediately beneath table 4 upon a support plate 174 (FIGURE 1) which is carried by the frame of the machine. The control cams 14 are mounted in common upon a cam shaft 175 which is journalled in bearings 176–176 mounted upon the support plate 174 (FIGURE 3). The cam shaft 175 is driven by a gear 177 keyed to the cam shaft 175 and meshing with a gear 178 keyed to the shaft 180 of the motor 12, the motor being mounted upon plate 174. The motor 12, which may be of the gear head type, includes manual means (not shown) for varying its speed, and thus the speed of the machine.

In the present example, there is provided two micro-switches 13—13 and companion cams 14—14 for each of the power cylinders of the machine. The pressure and exhaust of hydraulic fluid relative to the individual power cylinders is regulated by electrically operating reversing valves (not shown) which are interposed in the conduits leading to the respective power cylinders. In other words, one micro-switch 13 and its companion cam 14 controls the admission of fluid pressure to one end of a given cylinder while the second micro-switch 13 and its related cam 14 controls the admission of fluid pressure to the opposite end of the cylinder. The electrically operated reversing valves are connected to the hydraulic unit, which is indicated generally at 11 in FIGURE 1.

In order to precisely control the stroke of the several power cylinders, the individual cams of each pair 14 are adjustable with reference to the cam shaft 175. Each microswitch 13 includes a cam follower 181 mounted on the stem of the switch and bearing against the periphery of its related cam 14. It will be understood from the foregoing, that the sequential operation of the several power cylinders is regulated by the setting of the respective pairs of cams 14 and companion pairs of micro-switches 13, while the speed of the operating cycles is regulated by the variable speed cycle control motor 12.

The electrical control system may be of conventional design and has not been disclosed. However, it will be understood that the system includes a source of electrical energy having one side branching to the individual contacts of the micro-switches 13, with branch lines extending from the opposite side of the micro-siwtches to the electrically controlled reversing valves of the several power cylinders.

The reversing valves (not shown) are also of conventional design, consisting, for example, of solenoids which are connected to the plunger element for shifting the element to a forward and reverse position. By way of example, each solenoid may be provided with two actuating coils which are energized alternately for forward or reverse operation of the power cylinder with which it is associated.

In this arrangement, the pair of micro-switches 13 for a given power cylinder are connected with the ends of the pair of windings of the reversing valve which regulates the operation of that particular power cylinder by way of branch lines leading from the contacts of the pair of micro-switches 13 to the terminals of the windings. The circuit is completed through the windings by way of the second power line, which is interconnected with the common terminals of the two windings.

Thus, when one of the micro-switches 13 of a given pair is shifted to its closed position, a circuit is completed from one power line, through the switch to the related winding of the reversing valve, the circuit being completed by the second power line, which is connected in common to both windings of the reversing valve. This circuit is duplicated with respect to the windings of each reversing valve and related micro-switches 13, such that the reversing valves of the several cylinders are actuated in time with one another for sequential operation of the machine components at a rate controlled by the setting of the variable speed cycle control motor 12.

Fluid pressure is supplied by the hydraulic until 11 by way of a manifold having branch conduits (not shown) leading to the reversing valve of each power cylinder. An exhaust conduit (not shown) leads back from each reversing valve to the sump of the hydraulic pressure unit 11. The unit 11, as noted earlier, is conventional and includes a fluid pressure pump which is driven by an electric power motor.

Each power cylinder of the machine includes conduits 182 and 183 connected to the forward and rearward ends of the cylinder. The conduits 182 and 183, in the usual way, act alternately as pressure and exhaust conduits to reciprocate the piston in forward and reverse directions. The conduits 182 and 183 of each cylinder are connected to the reversing valve for that particular cylinder, the arrangement being such that the passages of the reversing valve supply fluid pressure to one conduit from the hydraulic unit 11 which exhausting fluid pressure from the opposite end of the cylinder through the passageways of i.s reversing valve back to the sump of the unit 11.

With the exception of the horizontal cylinders 20 and 21 (FIGURE 3) which reciprocate the forming plungers 15 and 16 horizontally, the pistons of the cylinders are held under fluid pressure in the position to which they have been shifted until the pressure supply is reversed, thus holding the component which is operated by that cylinder in the position to which it has been shifted. However, the fluid pressure supply to the cylinders 20 and 21 is arranged (for example, by suitable passageways in the reversing valves) to provide a bypass action after the pistons of these cylinders have been shifted to the limits of their horizontal reciprocation.

The purpose of this arrangement is to allow the plungers 15 and 16, with which these cylinders are associated, to shift or float horizontally in response to applied external pressure in the horizontal plane. This permits the forming plungers 15 and 16 to accommodate themselves to forces which are applied during the primary bending operation as the shuttle 6 swings about the axis of the respective plungers. The bypass action also permits the plungers to floats to a minor extent in response to the forces developed by the corrector heads 7, as the heads are advanced from their retracted position to embrace the wires which are confined around the forming plungers. The advantage of the floating action of the forming plungers 15 and 16 will be apparent from the description of the forming operation (FIGURES 10–21) which follows.

OPERATION

The operation of the essential components, consisting of the plunger assemblies 5, the shuttle 6 and the corrector heads 7, is disclosed in FIGURES 10–21. These views illustrate the forming steps, including certain procedures which contribute directly to, and which are necessary in imparting the precise configuration to the sinuous wires.

FIGURES 10 and 11 illustrate the start of a given cycle. It will be noted in FIGURE 10 that the shuttle 6 resides in its right-hand position, with the right-hand plunger 16 lowered, as indicated by the arrow 184, and with its lower end engaged against the top surface of an off-set 185, forming a part of the shuttle head 105.

As explained earlier, the shuttle head is carried by the rock shaft 110 and swings about the axis 186 of shaft 110. It will be noted in FIGURE 10 that the axis 186 of shuttle swing is off-set from the axis of the plunger 16. The off-set relationship of the plunger and axis of the shuttle facilitates the bending operation, the plunger being free to float in the horizontal plane by reason of the by-pass arrangement of the fluid pressure system, as explained above.

As the shuttle 6 begins swinging toward the left, as indicated by the arrow 187 (FIGURES 12 and 13) the straight wires A are looped around the plunger 16, which remains in its lowered position during the swinging shuttle motion. It will be understood at this point that the plunger 16 floats rearwardly during the bending operation, as indicated by the arrow 188 in the FIGURE 13. The rearward floating movement of plunger 16 continues in response to the swinging shuttle combined with the bending resistance of the wires A, such that the axis of plunger 16 shifts from its initial position to the rearwardly displaced position shown in FIGURE 13 and indicated by arrow 188.

Upon completion of the swing of shuttle 6 (FIGURES 14 and 15) the bight B will have been formed about plunger 16; immediately thereafter, the shuttle 6 shifts bodily toward the left, as indicated by the arrows 190 in these views. After the left-hand bodily motion of the shuttle, the left-hand plunger 15 is elevated above the shuttle (not shown).

After having been elevated, plunger 15 is shifted forwardly to the position shown at 189 in broken lines (arrow 191 FIGURE 15) then lowered to a position in front of the wires A, as indicated by the vertical arrow 192 in FIGURE 16 and also shown in FIGURE 17. In this position, the left-hand plunger 15 will have assumed approximately the same off-set position with respect to the axis 186 of the shuttle as was previously assumed by the right-hand plunger 16 (FIGURES 10 and 11).

At this stage in the cycle, the horizontal power cylinder 21 of the right-hand plunger 16 is activated to shift the plunger 16 rearwardly as indicated by the arrow 193 (FIGURE 19). It will be noted, at this stage, that the plunger 16, with the bight portion B, enters the recess 71 of the stationary wire guide block 67. It will also be noted, at this stage, that the right corrector head 7 is retracted as indicated by the arrow 194 (FIGURE 19) so as to shift the fork elements 53 clear of the recess 71, thereby to permit entry of plunger 16 with the wires curved about it as at B.

It will be noted in FIGURES 10–13 that, as the shuttle 6 swings toward the left, with the left plunger 15 lowered, the left corrector head 7 has been advnaced, as indicated by the arrow 195, with the fork element 53 in registry with plunger 15 and bight B of the wire. The left-hand corrector head 7 remains in the advanced position as the shuttle swings toward the left so as to confine the reach C of the wires as they are being bent around the right-hand plunger 16.

At this stage, the left-hand plunger 15 is elevated, as indicated by the arrow 196 (FIGURE 14) to clear the shuttle and upper wire A and is then shifted to its advanced position as shown in broken lines 189 and as described earlier.

After the left-hand plunger has been shifted forwardly and lowered, as shown in FIGURES 16 and 17, and as indicated by the arrows 191 and 192, the right-hand corrector head 7 is retracted, as indicated by the arrow 194 in FIGURE 19, while the left-hand corrector head remains in the advanced position to which it was shifted previously. The right-hand corrector head is retracted to provide clearance for the right-hand plunger 16.

At this stage, the shuttle 6 begins to swing from the left-hand position of FIGURE 19 toward the right, as indicated by the arrow 197 in FIGURES 20 and 21. The bending cycle for the next reach C is then repeated as described above with reference to FIGURES 12–15.

It will be understood from the foregoing that the corrector heads 7—7 are shifted alternately to their advanced positions as the plungers 15 and 16 advance rearwardly. After each rearward stepwise advancement of the plunger, for example, plunger 16, as shown in FIGURE 11, the corrector head for that plunger advances the fork elements and the head remains in that position. In each stroke, the retracted plunger, with previously bent wires, resides within the advanced fork elements 53 to confine the reaches C while the shuttle bends the wire about the opposed plunger, as indicated in FIGURES 13 and 21.

It will be noted in FIGURE 21, as noted earlier, that the fork elements are free to float in the horizontal plane during the bending operation, as indicated by the arrow 198 in FIGURE 21.

In the present example, the reaches C of the zigzag formation diverges slightly after the operation of the corrector heads 7. It will be understood, however, that the machine may be set up to bring the reaches C to parallel relationship or to a converging relationship as desired.

In producing the configuration which is illustrated, the wires during the bending and correcting operations, are sprung beyond their elastic limit, as indicated by the broken lines 200 in FIGURES 11 and 19, by operation of the correctors combined with the motion of the plungers. Upon vertical withdrawal of the plunger, followed by withdrawal of the corrector head, the formed portion of the wires spring rearwardly, as indicated by the arrow 201 in FIGURE 19, representing the permanent set of the formed wire, as shown in FIGURES 22 or 23.

It will be understood, therefore, that, depending upon the inherent flexibility of the wire stock, it is necessary to bend the wire to a greater or lesser degree beyond the elastic limit in order to impart the desired permanent set. The several features of adjustment of the machine make it possible to adapt the machine to the variable factors which are encountered.

Having described our invention, we claim:

1. A machine for bending a length of deformable material to a sinuous formation comprising:
   a machine base;
   a pair of bending elements spaced apart from one another and mounted for reciprocating motion along a first path relative to said base;
   first power means connected to said bending elements for reciprocating the same alternately relative to said base along said first path;
   said bending elements mounted for reciprocation along a second path which is disposed generally at right angles to said first path;
   second power means connected to said bending elements for reciprocating the bending elements alternately along said second path and in time with the alternate reciprocation thereof along said first path;
   a shuttle element mounted relative to said base and spaced outwardly from said spaced apart bending elements;
   means connected to said shuttle element for reciprocating the shuttle element along a path relative to said bending elements and to an extent corresponding generally to the spacing of said bending elements;
   said shuttle element having guide means for slideably engaging and advancing a length of said deformable material relative to said bending elements in time with the alternate reciprocating thereof, whereby that the deformable material is bent alternately about said forming elements to a generally sinuous formation.

2. A bending machine as set forth in claim 1 in which the shuttle element is mounted for swinging motion upon reaching the limits of reciprocation relative to the bending elements, whereby the shuttle element bends the length of deformable material about the respective bending elements in time with the ricprocating movements of the bending elements to said generally sinuous formation.

3. A bending machine as set forth in claim 1 in which there is provided a pair of corrector heads mounted relative to the machine base for alternate reciprocating motion along a path at right angles to the path of motion of said bending elements, said corrector heads including respective recesses for embracing the portion of the deformable material which is bent alternately about said forming elements, utilizing the forming elements as mandrels to impart the final sinuous shape to the deformable material.

4. A bending machine as set forth in claim 3 in which each of said corrector heads includes a fork element adapted to embrace the portion of the deformable material which is bent about the forming elements, said fork element being mounted for floating movement relative to the corrector heads.

5. A machine for bending a length of deformable material to a sinuous formation comprising:
   a machine base;
   a pair of bending elements spaced apart from one another for reciprocation along a first path relative to the said base;
   first means connected to said bending elements for reciprocating the same alternately relative to said base along said first path;
   said bending elements mounted for reciprocation along a second path which is disposed generally at right angles to said first path;
   second means connected to said bending elements for reciprocating the same alternately along said second path and in time with the alternate reciprocation thereof along said first path;
   a shuttle element mounted relative to said base and spaced outwardly from said bending elements;
   and means connected to said shuttle element for reciprocating the shuttle element along a path relative to said bending elements and to an extent corresponding generally to the spacing of said bending elements;
   said means reciprocating the shuttle element in time with the reciprocating movements of the bending elements;
   said shuttle element adapted to advance a length of said deformable material to said bending elements in time with the alternate reciprocation thereof; whereby the deformable material is bent alternately about said forming elements to a generally sinuous formation.

6. A machine for bending a length of deformable material to a sinuous formation comprising:
   a machine base;
   a pair of spaced forming plungers located apart from one another and shiftably mounted in a generally vertical position relative to said base;
   first power means connected to said spaced forming plungers for reciprocating said spaced plungers alternately along their respective vertical axes relative to the said base;
   second power means connected to said plungers for reciprocating the plungers alternately in a generally horizontal path in time with the vertical reciprocation thereof;
   a shuttle mounted for bodily reciprocation along a horizontal plane relative to the forming plungers in time with the reciprocating movements and to an extent corresponding generally to the spacing thereof, said shuttle adapted to swing in an arc at the limits of said bodily reciprocating motion;
   and power means for imparting said reciprocating and swinging movements to said shuttle in time with the vertical and horizontal reciprocations of said forming plungers;
   the said plungers adapted to be advanced alternately to a position forwardly of the deformable material which issues from the shuttle and to be lowered in front of the material issuing from the shuttle at the limit of reciprocation thereof, whereby upon each reciprocation and swinging movement of the shuttle, the material is bent about the lowered forming plunger, such that the sustained reciprocations of the plungers and shuttle bend the material to a sinuous formation.

7. A bending machine as set forth in claim 6 in which there is provided a pair of corrector heads mounted relative to the machine base for alternate reciprocating motion along a horizontal path at right angles to the horizontal path of motion of the forming plungers, said corrector heads each including a slideway, a fork mounting block shiftably mounted within said slideway, at least one fork element mounted in said fork mounting block and having a recess adapted to embrace the portion of the deformable material which is bent about the associated forming plunger, means for adjusting the position of the fork mounting block relative to the corrector head, and means for reciprocating the corrector heads along said horizontal path alternately in time with the alternate reciprocating movements of the forming plungers along said horizontal path, said fork elements including recesses for embracing the portion of the deformable material which is bent alternately about the forming plungers, utilizing the forming plungers as mandrels to impart the final sinuous shape to the deformable material.

8. A bending machine as set forth in claim 6 in which there is provided a carriage element for reciprocating the shuttle bodily relative to the forming plungers, the shuttle having a swinging end pivotally connected to said carriage adapting the shuttle to swing in said arc at the limits of reciprocating motion, first power means connected to the carriage for reciprocating the carriage and shuttle along said horizontal plane in time with the reciprocating movements of the forming plungers, and second power means mounted on said carriage and connected to the shuttle for imparting said swinging motion to the shuttle in time with the reciprocating motion of the carriage.

9. A bending machine as set forth in claim 8 in which the machine base is provided with a plurality of slide bars, said carriage being slidably connected to and supported by the slide bars for reciprocation relative to the forming plungers in time with the reciprocating movements thereof.

10. A bending machine as set forth in claim 6 in which the forming plungers are mounted for lateral adjustment relative to the machine base along a horizontal path at right angles to the horizontal path of motion along which the plungers reciprocate alternately, said adjustment means arranged to selectively locate the center-to-center spacing of the plungers along the vertical axes thereof, thereby to select the amplitude of the sinuous formation which is imparted to the deformable material.

11. A bending machine as set forth in claim 6 in which the power means for imparting said reciprocating movements to the shuttle in time with the vertical and horizontal reciprocations of the forming plungers includes means for adjusting the extent of the reciprocating motion of the shuttle along said horizontal plane, thereby to adjust the extent of shuttle reciprocation to a degree corresponding with the center-to-center adjustment of the forming plungers.

12. A bending machine as set forth in claim 6 in which the second power means which reciprocates the forming plungers alternately in said generally horizontal plane, includes means whereby said plungers are free to float after said plungers are advanced alternately to said position forwardly of the deformable material issuing from the shuttle at the limit of reciprocation thereof, whereby upon the swinging motion of the shuttle, the forming plunger is free to shift in its horizontal plane in response to the bending pressure as the deformable material is bent about the lowered forming plunger.

13. A machine for bending a length of deformable material to a sinuous formation as set forth in claim 6 in which said shuttle includes a plurality of passageways disposed in horizontal planes spaced one above the other for feeding a plurality of lengths of deformable material to said forming plungers, said plungers having sufficient length to extend in front of the plurality of lengths of deformable material, whereby upon each reciprocation and swinging movement of the shuttle a plurality of lengths of material are bent concurrently about the lowered plunger to impart a sinuous formation to said plurality of lengths of deformable material.

References Cited

UNITED STATES PATENTS

| | | | |
|---|---|---|---|
| 2,047,717 | 7/1936 | Van Dresser et al. | 140—71 |
| 2,483,865 | 10/1949 | Zimmerman | 140—71 |
| 2,783,782 | 3/1957 | Lincoln et al. | 140—71 |

CHARLES W. LANHAM, Primary Examiner

LOWELL A. LARSON, Assistant Examiner